(12) United States Patent
Lee et al.

(10) Patent No.: US 12,310,471 B2
(45) Date of Patent: May 27, 2025

(54) ELECTRONIC DEVICE COVER

(71) Applicant: SAMSUNG ELECTRONICS CO., LTD., Suwon-si (KR)

(72) Inventors: Wonseuk Lee, Suwon-si (KR); Heesuk Wang, Suwon-si (KR); Namhyun Kang, Suwon-si (KR); Minah Koh, Suwon-si (KR); Hakdo Kim, Suwon-si (KR); Sol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 18/100,306

(22) Filed: Jan. 23, 2023

(65) Prior Publication Data

US 2023/0148721 A1 May 18, 2023

Related U.S. Application Data

(63) Continuation of application No. PCT/KR2021/008420, filed on Jul. 2, 2021.

(30) Foreign Application Priority Data

Jul. 22, 2020 (KR) .................. 10-2020-0091306

(51) Int. Cl.
*A45C 11/00* (2006.01)
*A45C 3/00* (2006.01)
(Continued)

(52) U.S. Cl.
CPC ............ *A45C 11/00* (2013.01); *A45C 13/005* (2013.01); *A45C 13/1069* (2013.01);
(Continued)

(58) Field of Classification Search
CPC ... A45C 11/00; A45C 13/005; A45C 13/1069; A45C 2011/003; A45C 2200/15;
(Continued)

(56) References Cited

U.S. PATENT DOCUMENTS 5,463,794 A * 11/1995 Erland ................ B29C 43/3642
16/385
8,714,351 B2 5/2014 Toulotte
(Continued)

FOREIGN PATENT DOCUMENTS

KR 20-0468388 Y1 8/2013
KR 10-2015-0022614 A 3/2015
(Continued)

OTHER PUBLICATIONS

Communication dated Oct. 28, 2021, issued by the International Searching Authority in counterpart International Application No. PCT/KR2021/008420 (PCT/ISA/210).
(Continued)

*Primary Examiner* — Andrew D Perreault
(74) *Attorney, Agent, or Firm* — Sughrue Mion, PLLC

(57) ABSTRACT

According to an embodiment of the present invention, an electronic device cover includes: a first plate that can be attached/detached to/from one surface of the electronic device; a second plate overlappingly coupled to the first plate; and a third plate which is connected to the second plate by a hinge and of which the angle formed with the first plate changes according to rotation with respect to the second plate, wherein the second plate and/or the third plate includes a composite material sheet, and at least a portion of the hinge can be positioned inside the composite material sheet. Other various embodiments are possible.

13 Claims, 14 Drawing Sheets

(51) Int. Cl.
*A45C 13/00* (2006.01)
*A45C 13/10* (2006.01)
*G06F 1/16* (2006.01)

(52) U.S. Cl.
CPC .......... *G06F 1/1628* (2013.01); *A45C 11/003* (2025.01); *A45C 2200/15* (2013.01)

(58) Field of Classification Search
CPC .. A45C 13/002; G06F 1/1628; H04M 1/0214; H04M 1/185; H04M 1/04; H05K 5/03
USPC ......................................................... 206/320
See application file for complete search history.

(56) References Cited

U.S. PATENT DOCUMENTS

| | | | |
|---|---|---|---|
| 8,878,637 | B2 | 11/2014 | Sartee et al. |
| 9,740,238 | B2 | 8/2017 | Han |
| 9,748,999 | B2 | 8/2017 | Nyholm et al. |
| 10,411,748 | B1 | 9/2019 | Lucente |
| 10,722,014 | B2 | 7/2020 | Kim et al. |
| 11,009,918 | B2 | 5/2021 | Oakeson et al. |
| 11,184,989 | B2 | 11/2021 | Kang et al. |
| 2012/0037285 | A1 | 2/2012 | Diebel et al. |
| 2014/0007377 | A1* | 1/2014 | Masini ..................... E05D 1/00 16/225 |
| 2014/0104765 | A1 | 4/2014 | Hoshino |
| 2015/0282354 | A1* | 10/2015 | Spollen .................. H05K 5/03 206/45.2 |
| 2016/0026218 | A1 | 1/2016 | Jefferies et al. |
| 2018/0168303 | A1 | 6/2018 | Marks |
| 2019/0159561 | A1 | 5/2019 | Kim et al. |
| 2020/0190877 | A1 | 6/2020 | Zhai et al. |
| 2020/0297089 | A1* | 9/2020 | Yen ..................... A45C 13/005 |
| 2020/0363837 | A1 | 11/2020 | Park |
| 2021/0037666 | A1* | 2/2021 | Kang ..................... H05K 5/03 |
| 2022/0061175 | A1 | 2/2022 | Oh et al. |
| 2022/0142315 | A1 | 5/2022 | Wang et al. |

FOREIGN PATENT DOCUMENTS

| | | |
|---|---|---|
| KR | 10-2015-0034816 A | 4/2015 |
| KR | 10-2017-0116854 A | 10/2017 |
| KR | 10-2020-0072190 A | 6/2020 |
| KR | 10-2021-0014252 A | 2/2021 |
| KR | 10-2021-0016236 A | 2/2021 |
| WO | 2019/135609 A1 | 7/2019 |

OTHER PUBLICATIONS

Communication dated Oct. 28, 2021, issued by the International Searching Authority in counterpart International Application No. PCT/KR2021/008420 (PCT/ISA/237).
Communication dated Nov. 23, 2023, issued by the European Patent Office in counterpart European Application No. 21845903.0.
Communication issued on Aug. 10, 2024 by the Korean Intellectual Property Office for Korean Patent Application No. 10-2020-0091306.

* cited by examiner

ELECTRONIC DEVICE COVER

CROSS-REFERENCE TO RELATED APPLICATIONS

This application is a bypass continuation of International Application No. PCT/KR2021/008420, filed on Jul. 2, 2021, which claims priority from Korean Patent Application No. 10-2020-0091306 filed on Jul. 22, 2020, in the Korean Intellectual Property Office, the contents of which are incorporated by reference in their entireties.

BACKGROUND

1. Technical Field

Various embodiments of the present disclosure relate to an electronic device cover.

2. Description of the Related Art

A cover may be attached to an electronic device such as a tablet PC. The cover may protect the electronic device. A collapsible cover may be used to mount an electronic device at various angles.

For example, the cover may include a collapsible structure that allows a user to freely adjust an angle at which the electronic device is mounted. The collapsible structure may be included in the cover so that the cover may be maintained or fixed at any angle. However, the collapsible structure makes it difficult for the cover to be slim.

SUMMARY

Various embodiments of the present disclosure may provide an electronic device cover capable of contributing to slimness by simplifying a structure.

Technical problems to be solved by the present disclosure are not limited to the above-mentioned technical problems, and other technical problems, which are not mentioned above, may be clearly understood from the following descriptions by those skilled in the art to which the present disclosure pertains.

According to an embodiment of the present disclosure, disclosed is a cover for an electronic device, the cover including: a first plate configured to be attached to or detached from one surface of the electronic device; a second plate disposed to overlap the first plate; and a third plate connected to the second plate by a hinge and configured such that an angle defined by the third plate and the first plate is changed by a rotation of the third plate relative to the second plate, wherein at least one of the second plate or the third plate includes a composite material sheet, and wherein at least a part of the hinge is disposed in the composite material sheet.

In an embodiment, the second and the third plates include composite material sheets, and the hinge includes: one or more first hinge plates at least partially disposed in the composite material sheet of the second plate; one or more second hinge plates at least partially disposed in another composite material sheet of the third plate; and a rotary part configured to connect the one or more first hinge plates and the one or more second hinge plates.

In an embodiment, the cover further includes: a plurality of magnetic elements at least partially disposed in a composite material sheet of the first plate, wherein the plurality of magnetic elements applies an attractive force between the first plate and the electronic device.

In an embodiment, the cover further includes: a magnetic element at least partially disposed in a composite material sheet of the first plate; and another magnetic element at least partially disposed in another composite material sheet of the third plate, wherein the magnetic element and the other magnetic element overlaps each other and applies an attractive force between the first plate and the third plate when the first plate and the third plate define an angle of 0 degree.

In an embodiment, the cover further includes: a fourth plate disposed at a side opposite to the third plate and configured to be rotatable relative to the second plate.

The electronic device cover according to an embodiment of the present disclosure may contribute to slimness and simplify a manufacturing process thereof.

Other effects, which may be obtained or expected by various embodiments of the present disclosure, will be directly or implicitly disclosed in the detailed description on the embodiments of the present disclosure. For example, various effects expected according to various embodiments of the present disclosure will be disclosed in the detailed description to be described below.

DETAILED DESCRIPTION OF THE EMBODIMENTS

Figure 1:
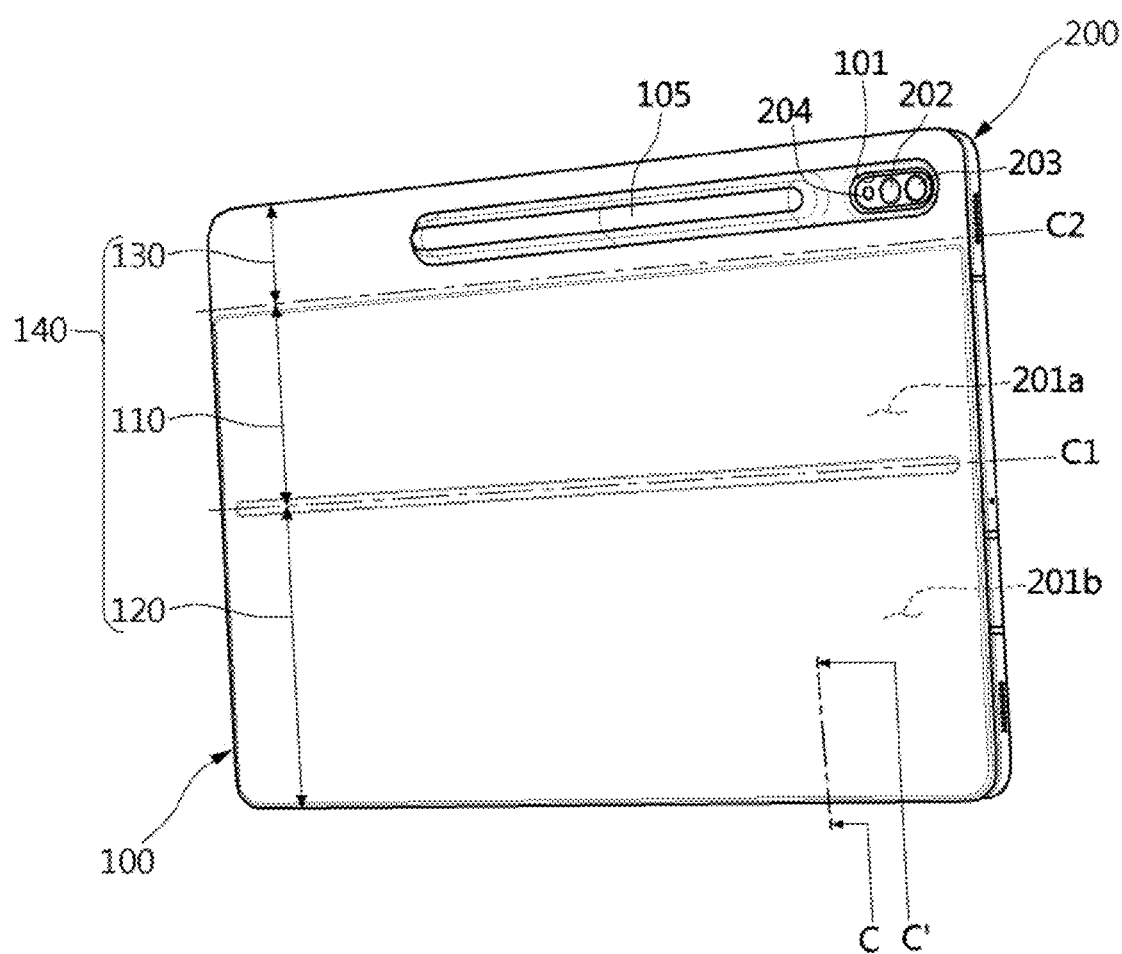
FIGS. 1, 2, 3, and 4 are views illustrating a state in which a cover according to an embodiment is attached to an electronic device.

Hereinafter, various embodiments of the present document will be described with reference to the accompanying drawings.

Various embodiments of the present document and the terms used in the embodiments are not intended to limit the technical features disclosed in the present document to the particular embodiments and should be understood as including various alterations, equivalents, or alternatives of the corresponding embodiments. In connection with the description of the drawings, the same or similar reference numerals may be used for the similar components. A singular form of a noun corresponding to an item may include one or more of the items, unless the relevant context clearly indicates otherwise. As used in the present document, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

FIG. 1, 2, 3, or 4 illustrates a state in which a cover 100 according to an embodiment is attached to an electronic device 200.

According to an embodiment, the cover 100 may be attached to the electronic device 200 (e.g., a tablet PC (a tablet personal computer)). For example, the cover 100 may be attached to a rear surface (e.g., a rear surface 201 in FIG. 4) of the electronic device 200. The rear surface of the electronic device 200 may be a surface directed in a direction opposite to a direction in which a display of the electronic device 200 is directed. The cover 100 may be a collapsible cover that allows a user to freely adjust an angle at which the electronic device 200 is mounted.

According to an embodiment, the cover 100 may include a folding structure and be disposed in an unfolded state (a flat state) or a folded state by using the folding structure. FIG. 1 illustrates the unfolded state of the cover 100 attached to the electronic device 200. The cover 100 may include a cover part assembly 140 (see FIG. 1 or 2) including a first cover part 110, a second cover part 120, and/or a third cover part 130. The second cover part 120 may be rotatably connected to one side of the first cover part 110, and the third cover part 130 may be rotatably connected to the other side of the first cover part 110. The cover 100 may include a folding part between the first cover part 110 and the second cover part 120, and another folding part between the first cover part 110 and the third cover part 130. In a state in which the cover 100 is attached to the electronic device 200, the second cover part 120 may rotate about a first folding axis (or a first rotation axis) C1 of the folding part relative to the first cover part 110, and the third cover part 130 may rotate about a second folding axis (or a second rotation axis) C2 of another folding part relative to the first cover part 110. The first folding axis C1 and the second folding axis C2 may be substantially parallel to each other. For example, the first cover part 110, the second cover part 120, and the third cover part 130 may be rectangular plates having the same width in a direction of the folding axis (e.g., the first folding axis C1 or the second folding axis C2). The cover 100 may be unfolded in the form (e.g., a rectangular shape) in which the cover 100 mostly overlaps the rear surface of the electronic device 200 (see FIG. 1). In the unfolded state, for example, the first cover part 110 and the second cover part 120 may substantially define an angle of 180 degrees, or the second cover part 120 and the rear surface of the electronic device 200 may substantially define an angle of 0 degree. In the unfolded state, for example, the first cover part 110 and the third cover part 130 may substantially define an angle of 180 degrees, or the third cover part 130 and the rear surface of the electronic device 200 may substantially define 0 degree. The angle between the first cover part 110 and the second cover part 120 or the angle between the first cover part 110 and the third cover part 130 has been described on the basis of a state in which the rear surface of the electronic device 200 is substantially flat. However, the cover may be implemented on the basis of the shape of the rear surface of the electronic device 200, such that the angle between the cover part or the angle between the cover part and the rear surface may be variously implemented.

Figure 2:
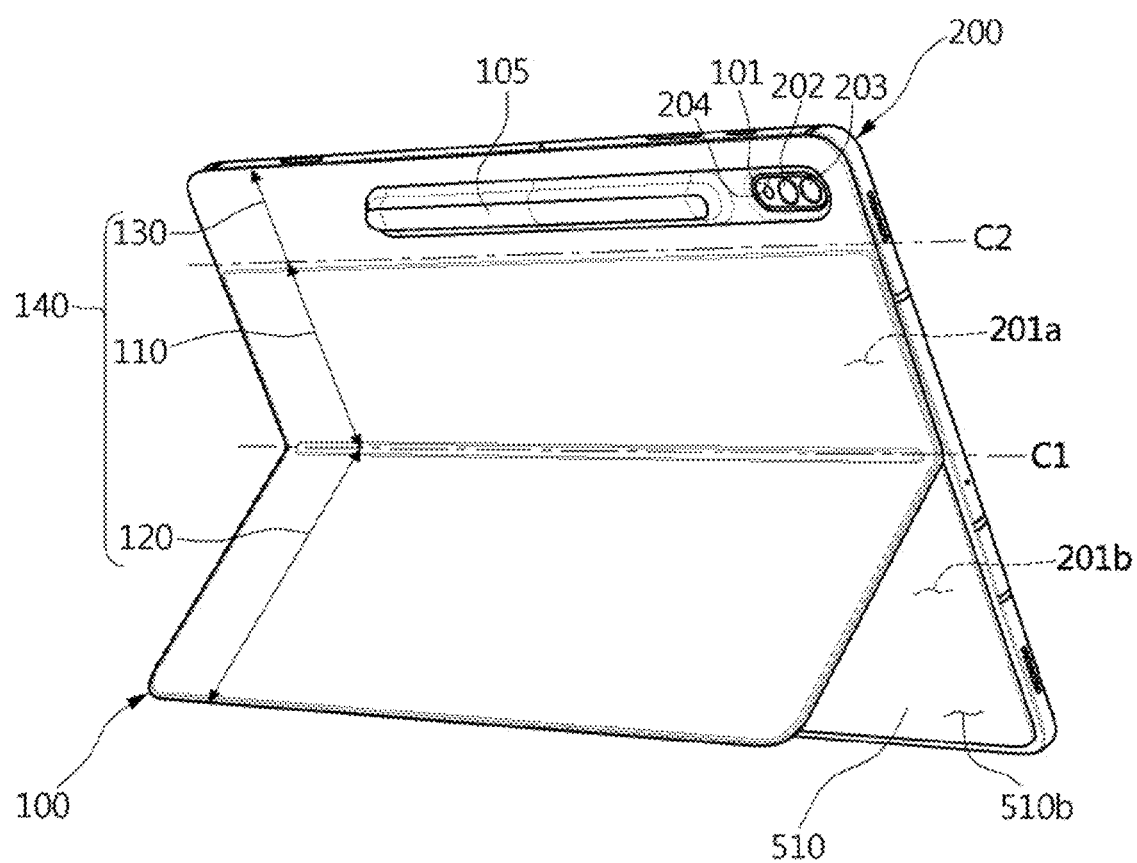
Figure 3:
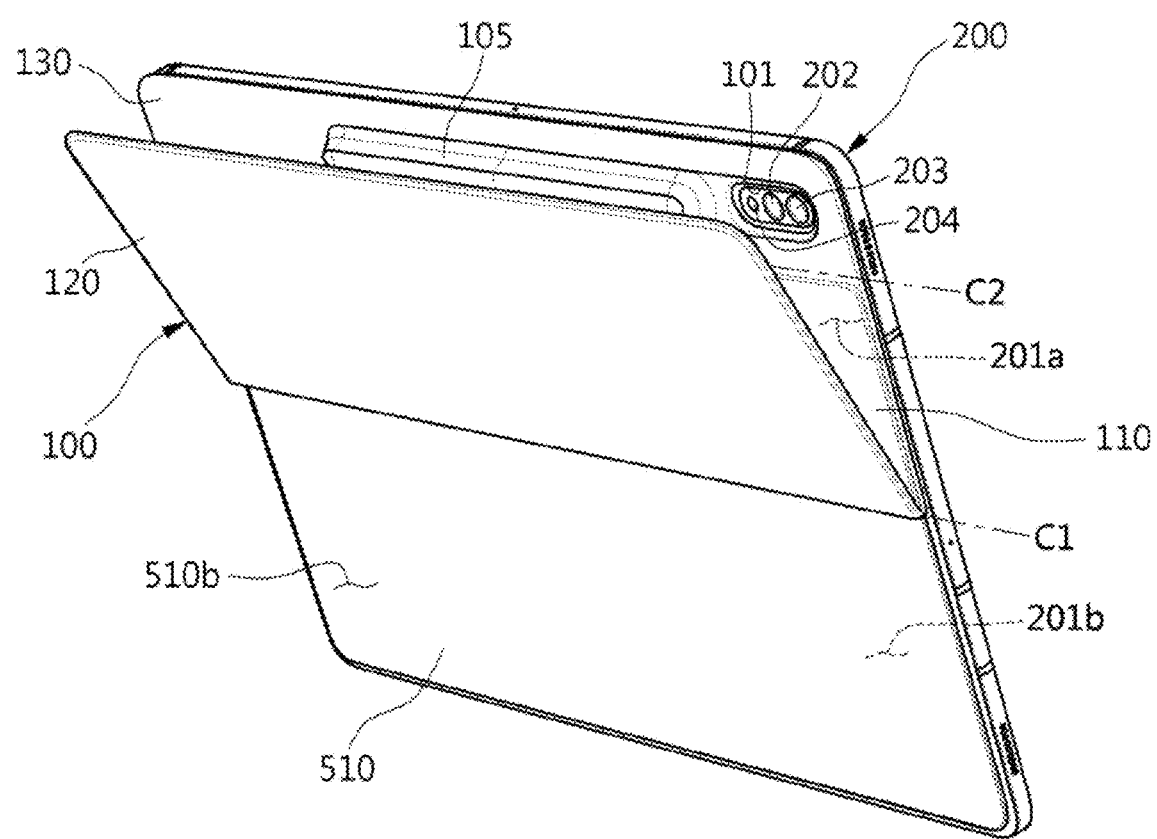
Figure 4:
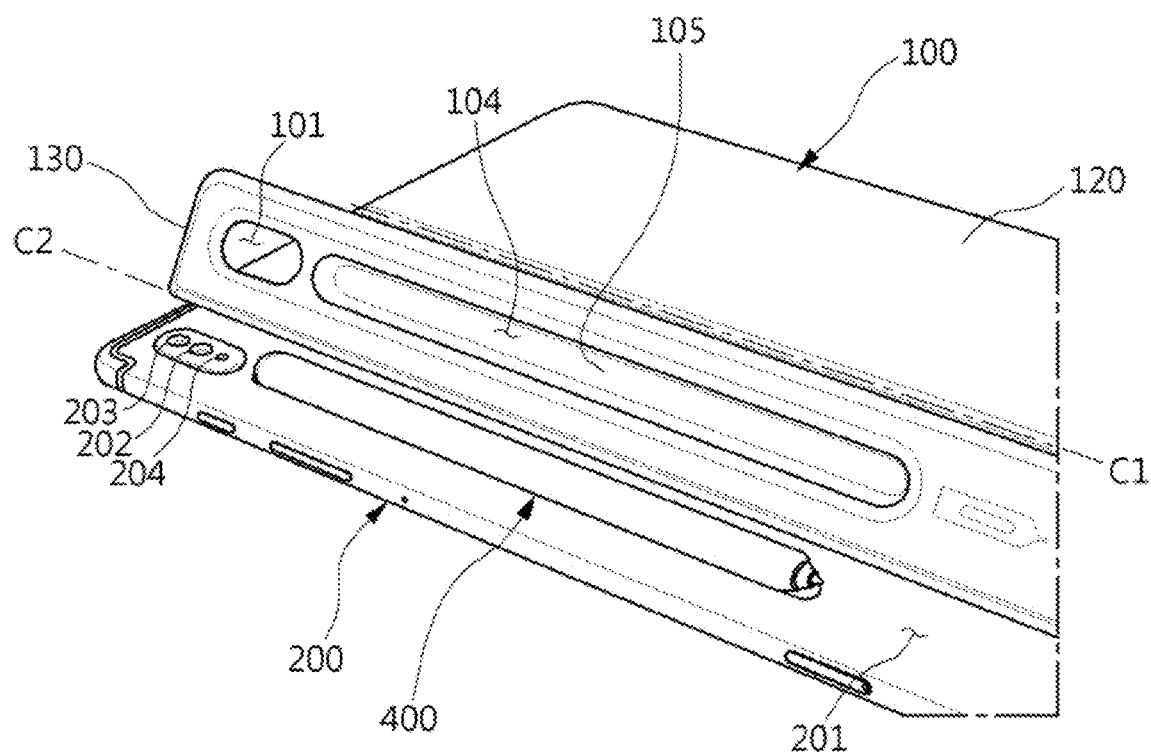

FIG. 2, 3, or 4 illustrates the folded state of the cover 100 attached to the electronic device 200 according to an embodiment. For example, FIG. 2 or 3 illustrates a first folded state in which the second cover part 120 is rotated about the first folding axis C1 relative to the first cover part 110. In the first folded state of the cover 100, the second cover part 120 may be used as a support, such that the electronic device 200 may stand on an object such as a table. An angle at which the electronic device 200 stands (or a direction in which a screen of the electronic device 200 is directed) may vary depending on the angle between the second cover part 120 and the first cover part 110 or the angle between the second cover part 120 and the rear surface of the electronic device 200.

For example, a pen input device 400 (e.g., a stylus pen) (see FIG. 4) may be positioned on the rear surface 201 of the electronic device 200. The pen input device 400 may be positioned on the rear surface 201 of the electronic device 200 by an attractive force between a magnetic element (e.g., a magnet) included in the pen input device 400 and a magnetic element (e.g., a magnet) included in the electronic device 200. According to an embodiment, the third cover part 130 of the cover 100 may include a pen cover part 105 including a recess (e.g., a concavely recessed space) 104 that accommodates at least a part of the pen input device 400. In case that the third cover part 130 is attached to the rear surface 201 of the electronic device 200 or the first cover part 110 and the third cover part 130 substantially define an angle of 180 degrees (see FIG. 1, 2, or 3), at least a part of the pen input device 400 attached to the rear surface 201 of the electronic device 200 may be accommodated in the recess 104 and covered by the pen cover part 105. For example, the pen cover part 105 may have a protruding shape including the recess 104. As illustrated in FIG. 4, in a second folded state in which the third cover part 130 is rotated about the second folding axis C2 relative to the first cover part 110, the pen input device 400 attached to the rear surface 201 of the electronic device 200 may be exposed to the outside.

For example, the electronic device 200 may include a first camera module 202, a second camera module 203, and/or a flash 204 disposed on the rear surface 201. According to an embodiment, the third cover part 130 of the cover 100 may include a first opening 101. In case that the third cover part 130 is attached to the rear surface 201 of the electronic device 200 or the first cover part 110 and the third cover part 130 substantially define an angle of 180 degrees (see FIG. 1, 2, or 3), the first camera module 202, the second camera module 203, and the flash 204 may overlap the first opening 101 and be exposed to the outside.

According to any embodiment, the electronic device 200 may not support the function of attaching or detaching the pen input device 400. In this case, the third cover part 130 of the cover 100 may be eliminated or substituted for the third cover part 130, such that the first cover part 110 may be further expanded.

According to an embodiment, the cover 100 may include a first plate 510 (see FIG. 2 or 3). The cover 100 may be attached to the electronic device 200 by using the first plate 510. For example, a plurality of magnetic elements (e.g., magnets) may be disposed in the first plate 510. The first plate 510 may be attached to the rear surface 201 of the electronic device 200 by an attractive force between the plurality of magnetic elements disposed in the first plate 510 and the magnetic elements included in the electronic device 200. The rear surface 201 of the electronic device 200 may include a third area 201a that overlaps the first cover part 110. The rear surface 201 of the electronic device 200 may include a fourth area 201b that may overlap the second cover part 120. The first plate 510 may include a first area (not illustrated) positioned between the first cover part 110 and the third area 201a of the rear surface 201. The first plate 510 may include a second area 510b extending from the first area and configured to face the fourth area 201b of the rear surface 201. The first cover part 110 may be attached to the rear surface 201 of the electronic device 200 by an attractive force between at least one magnetic element (e.g., a magnet) positioned in the first area of the first plate 510 and at least one magnetic element (e.g., a magnet) included in the electronic device 200. The second area 510b of the first plate 510 may be attached to the rear surface 201 of the electronic device 200 by an attractive force between one or more magnetic elements positioned in the second area 510b of the first plate 510 and one or more magnetic elements included in the electronic device 200. The second cover part 120 and attached to the second area 510b by an attractive force between at least one magnetic element included in the second area 510b and the at least one magnetic element included in the second cover part 120 (e.g., see FIG. 1). The second cover part 120 may be separated from the second area 510b by being rotated by an external force and define a corresponding angle with the second area 510b (see FIG. 2 or 3).

According to an embodiment, the third cover part 130 may be attached to the rear surface 201 of the electronic device 200 by an attractive force between at least one magnetic element included in the third cover part 130 and at least one magnetic element included in the electronic device 200 (see FIG. 1, 2, or 3). The third cover part 130 may be separated from the rear surface 201 of the electronic device 200 by being rotated by an external force and define a corresponding angle with the rear surface 201 (see FIG. 4).

According to an embodiment, the cover 100 may include a hinge (or a hinge structure) that defines the first folding axis C1. For example, the hinge may include at least one first hinge arm coupled to the first cover part 110, at least one second hinge arm coupled to the second cover part 120, and a rotary part configured to connect at least one first hinge arm and at least one second hinge arm. The first folding axis C1 may be defined by the rotary part of the hinge. The hinge enables the user to freely adjust an angle between the first cover part 110 and the second cover part 120. The hinge may have a fixing force that may maintain the first cover part 110 and the second cover part 120 at any angle. For example, the hinge may include a free-stop hinge.

According to an embodiment, at least a part of the hinge may be positioned in the first cover part 110 or the second cover part 120. For example, at least one first hinge arm may extend into the first cover part 110. According to an embodiment, the first hinge arm may be provided on a second plate by in-molding, and the second plate may be included in the first cover part 110 and provided in the form of a sheet made of a composite material. For example, at least one second hinge arm may extend into the second cover part 120. According to an embodiment, the second hinge arm may be provided on a third plate by in-molding, and the third plate may be included in the second cover part 120 and provided in the form of a sheet made of a composite material.

Figure 5:
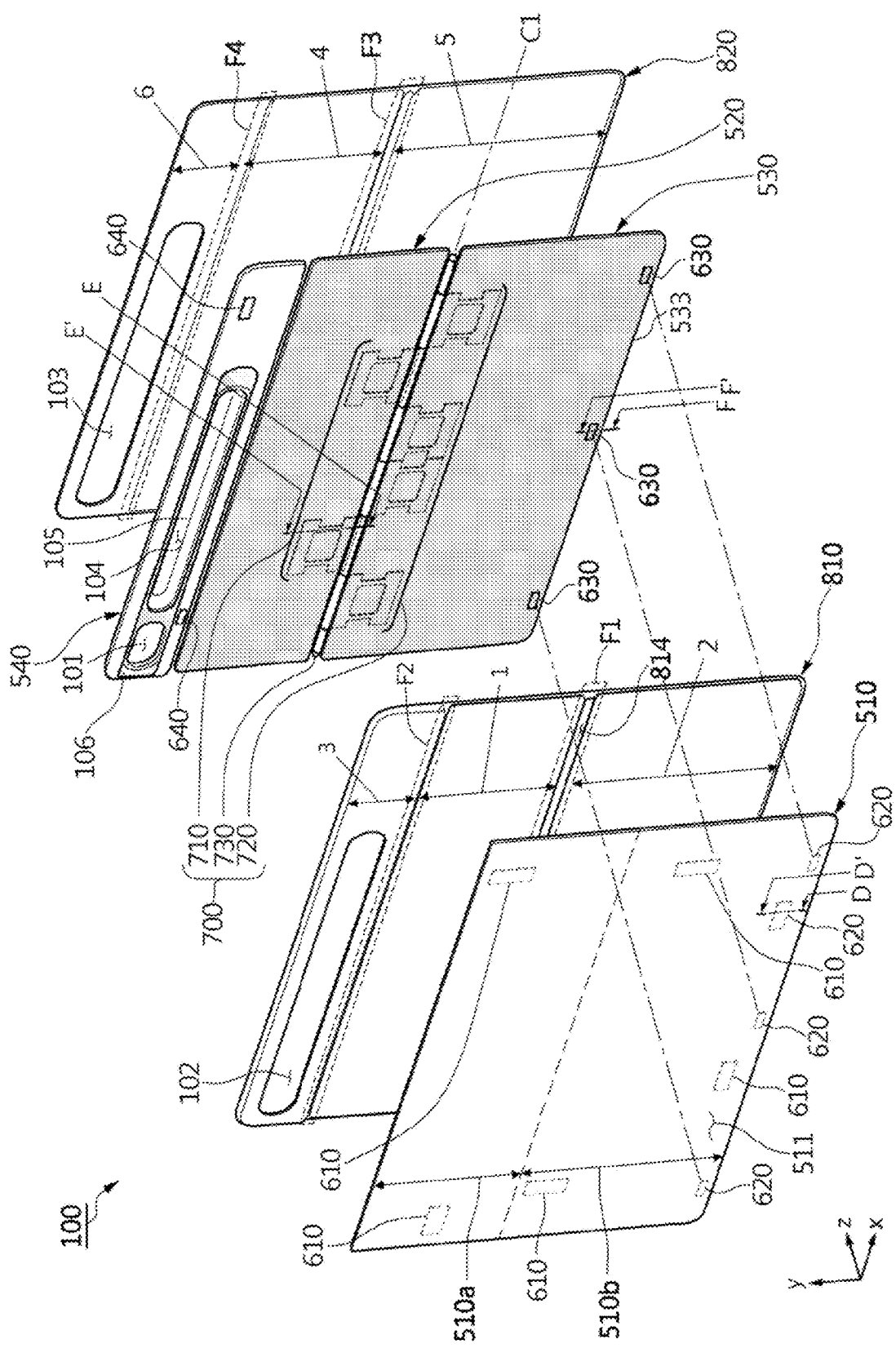
FIG. 5 is a deployed perspective view of the cover according to an embodiment illustrated in FIG. 1.
Figure 6A:
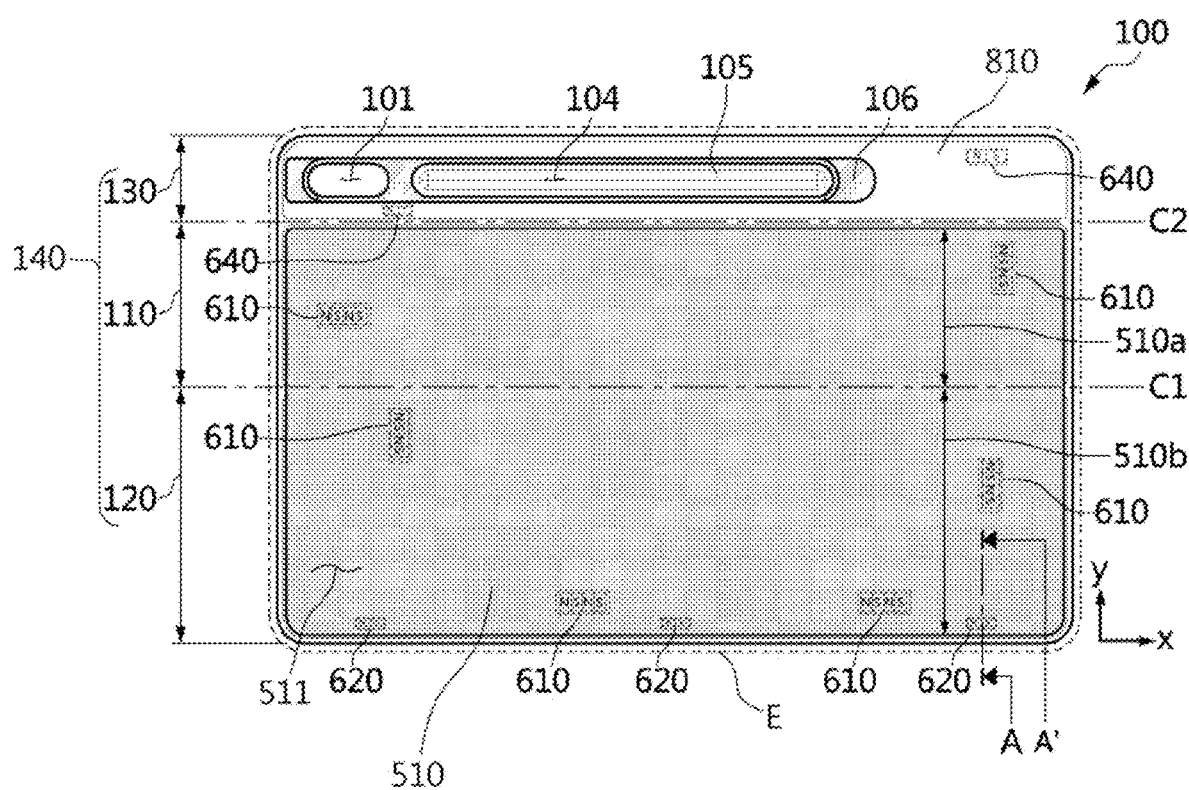
FIGS. 6A and 6B are top plan views of the cover in an unfolded state according to an embodiment.
Figure 6B:
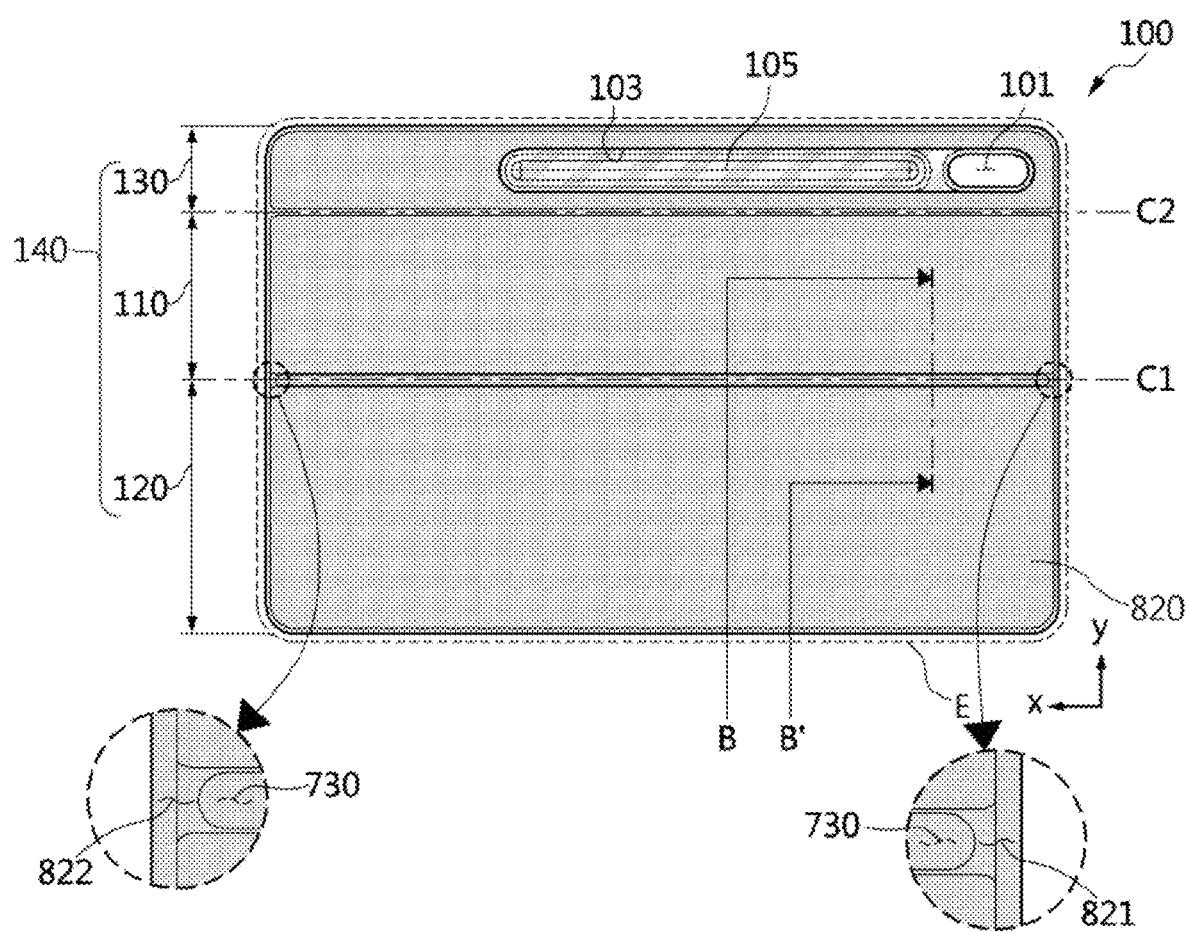
Figure 7A:
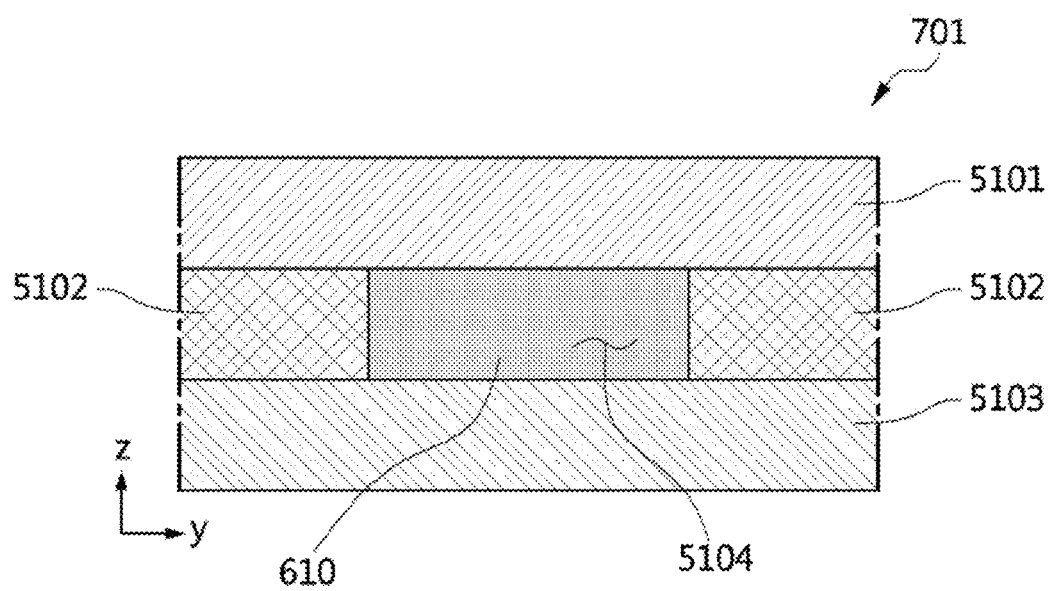
FIG. 7A is a view illustrating a cross-sectional structure taken along line D-D' in FIG. 5 according to an embodiment.
Figure 7B:
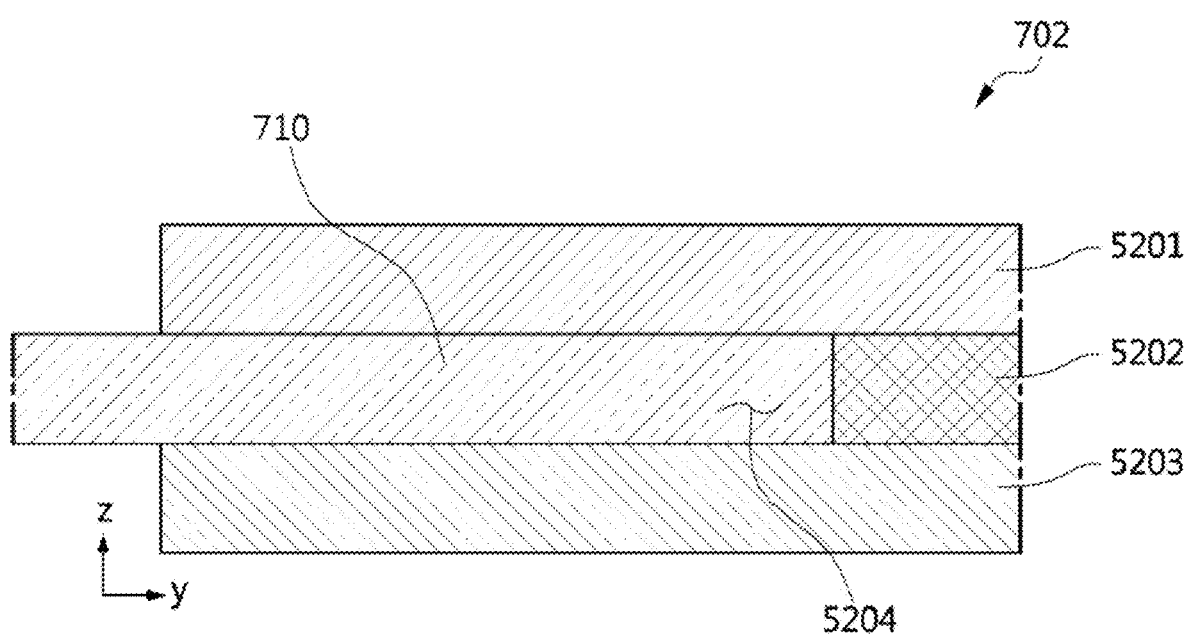
FIG. 7B is a view illustrating a cross-sectional structure taken along line E-E' in FIG. 5 according to an embodiment.
Figure 7C:
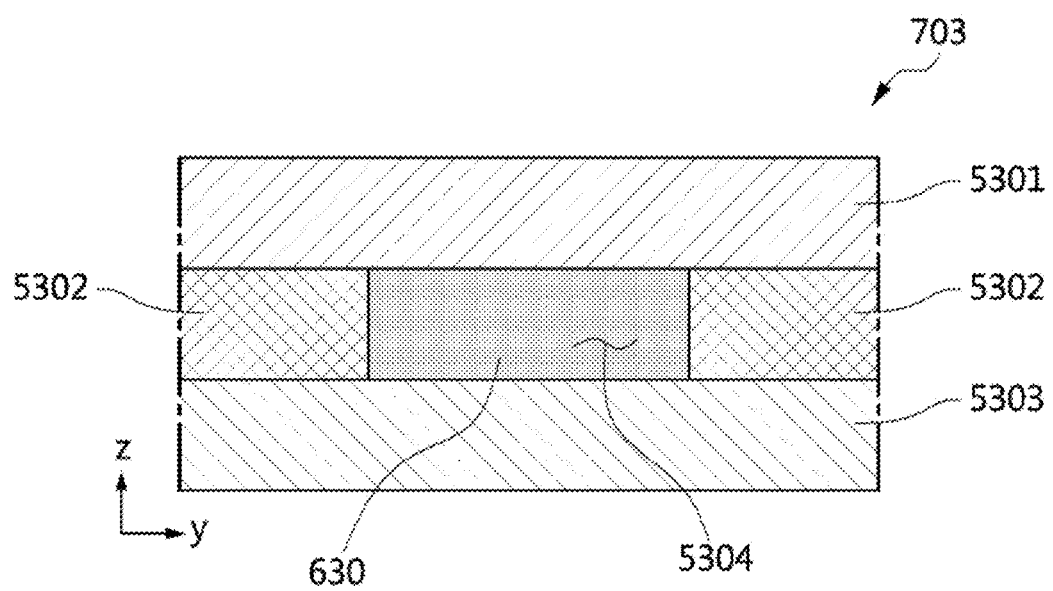
FIG. 7C is a view illustrating a cross-sectional structure taken along line F-F' in FIG. 5 according to an embodiment.

FIG. 5 is a deployed perspective view of the cover 100 according to an embodiment illustrated in FIG. 1. FIG. 6A or 6B is a top plan view of the cover 100 in the unfolded state according to an embodiment. FIG. 7A is a view illustrating a cross-sectional structure 701 taken along line D-D' in FIG. 5 according to an embodiment. FIG. 7B is a view illustrating a cross-sectional structure 702 taken along line E-E' in FIG. 5 according to an embodiment. FIG. 7C is a view illustrating a cross-sectional structure 703 taken along line F-F' in FIG. 5 according to an embodiment.

With reference to FIG. 5, in an embodiment, the cover 100 may include the first plate 510, a second plate 520, a third plate 530, a fourth plate 540, a plurality of first magnetic elements 610, one or more second magnetic elements 620, one or more third magnetic elements 630, one or more fourth magnetic elements 640, a hinge 700, a first sheet 810, or a second sheet 820. A repeated description of some of the reference numerals will be omitted.

According to an embodiment, with reference to FIGS. 5 and 6A, the first plate 510 may include the first area 510a and the second area 510b. For example, the first area 510a and the second area 510b may be rectangular areas extending in two opposite directions based on the first folding axis C1 and having the same width extending in the direction of the first folding axis C1 when viewed from above the first plate 510.

According to an embodiment, the plurality of first magnetic elements 610 (e.g., the plurality of first magnets) may be positioned in the first plate 510. In FIG. 1, the electronic device 200 may include a plurality of magnetic elements corresponding to the plurality of first magnetic elements 610. The first plate 510 may be attached to the electronic device 200 by an attractive force between the plurality of first magnetic elements 610 and the plurality of magnetic elements included in the electronic device 200. The first plate 510 may include a first surface 511, and a second surface (not illustrated) directed in a direction opposite to the first surface 511. For example, when the cover 100 is attached to the electronic device 200 (see FIG. 1), the first surface 511 may face the rear surface 201 of the electronic device 200 (see FIG. 4). The plurality of first magnetic elements 610 may be provided between the first surface 511 and the second surface and positioned in the first plate 510. According to various embodiments, the plurality of first magnetic elements 610 may be at least partially disposed in the first plate 510 so as to be closer to the first surface 511 than the second surface. According to various embodiments, the plurality of first magnetic elements 610 may be disposed in a recess (not illustrated) formed in the first surface 511 and may not protrude with respect to the first surface 511. According to any embodiment, the plurality of first magnetic elements 610 may be disposed in a recess (not illustrated) formed in the second surface.

According to an embodiment, the plurality of first magnetic elements 610 may be positioned in the first plate 510 and disposed at spacing distances. For example, some of the plurality of first magnetic elements 610 may be positioned in the first area 510a, and some of the plurality of first magnetic elements 610 may be positioned in the second area 510b. The number of the plurality of first magnetic elements or the positions of the plurality of first magnetic elements may be variously provided without being limited to an embodiment illustrated in FIG. 5 or 6A.

According to an embodiment, the first plate 510 may include a first composite material sheet. For example, the first plate 510 may be formed by compressing (e.g., thermally compressing) a plurality of prepregs (pre-impregnated materials). For example, the prepreg may be a composite material intermediate material made by infiltrating a coupling agent (e.g., liquid synthetic resin) into reinforcing fibers (or fiber reinforcement) (or impregnating reinforcing fibers (or fiber reinforcement) with a coupling agent (e.g., liquid synthetic resin)). For example, the reinforcing fiber of the prepreg may include at least one of carbon fiber, fiberglass, or aramid fiber. For example, the coupling agent of the prepreg may include at least one of epoxy resin, polyester resin, or thermoplastic resin. With reference to the cross-sectional structure 701 (see FIG. 7A) taken along line D-D' in FIG. 5, the first plate 510 may include a first layer 5101, a second layer 5102, and a third layer 5103, for example. The second layer 5102 (e.g., an inner core) may be positioned between the first layer 5101 and the third layer 5103. For example, the first layer 5101, the second layer 5102, and/or the third layer 5103 may be formed by compressing (e.g., thermally compressing) a plurality of prepregs. The second layer 5102 may include a first space portion 5104 (e.g., an opening) in which one of the plurality of first magnetic elements 610 is disposed. An operation of disposing the one of the plurality of first magnetic elements 610 in the first space portion 5104 of the second layer 5102 and an operation of coupling (e.g., thermally compressing) the first layer 5101, the second layer 5102, and the third layer 5103 by using an adhesive material (e.g., a thermally reactive adhesive agent) may be performed. With this method, the plurality of first magnetic elements 610 may be positioned in the first plate 510 (e.g., in-molding). The plurality of first magnetic elements 610 may be coupled to the first layer 5101, the second layer 5102, and the third layer 5103 by means of the adhesive material. The number of layers included in the first plate 510 may vary without being limited to an embodiment illustrated in FIG. 7A.

According to another embodiment, the first plate 510 may be implemented to be coupled to the plurality of first magnetic elements 610 by using insert molding. According to various embodiments, the first plate 510 may include a plurality of layers (or sheets). The plurality of first magnetic elements may be positioned between the plurality of layers. For example, the first plate 510 may include various polymer layers.

For example, the plurality of first magnetic elements 610 may have one or more magnetic structure arrangements including first polarities of N-polarities and second polarities of S-polarities (two arrangements in the example illustrated in FIG. 6A). The magnetic structure arrangements of some of the plurality of first magnetic elements 610 may be disposed in an x-axis direction, and the magnetic structure arrangements of some of the plurality of first magnetic elements 610 may be disposed in a y-axis direction. The arrangement direction of the magnetic structure and/or the positions of the plurality of first magnetic elements 610 may guide the position or direction in which the first plate 510 is attached to the electronic device 200 to the user.

According to an embodiment, the second plate 520 and the third plate 530 may be connected by the hinge 700. The hinge 700 may include one or more first hinge arms 710, one or more second hinge arms 720, and a rotary part 730. The one or more first hinge arms 710 may be coupled to the second plate 520. The one or more second hinge arms 720 may be coupled to the third plate 530. The rotary part 730 may connect the one or more first hinge arms 710 and the one or more second hinge arms 720. The second plate 520 coupled to the one or more first hinge arms 710 and the third plate 530 coupled to the one or more second hinge arms 720 may rotate relative to each other by means of the rotary part 730. The rotary part 730 may have a fixing force that may maintain a positional relationship between the second plate 520 and the third plate 530 at any angle between the second plate 520 and the third plate 530.

According to an embodiment, at least a part of the hinge 700 may be positioned in the second plate 520 or the third plate 530. For example, the one or more first hinge arms 710 may extend into the second plate 520. For example, the one or more second hinge arms 720 may extend into the third plate 530. The second plate 520 and/or the third plate 530 may include various polymers such as epoxy.

According to an embodiment, the second plate 520 may include a second composite material sheet. For example, the second plate 520 may be formed by compressing (e.g., thermally compressing) a plurality of prepregs. With reference to the cross-sectional structure 702 (see FIG. 7B) taken along line E-E' in FIG. 5, the second plate 520 may include a first layer 5201, a second layer 5202, and a third layer 5203, for example. The second layer 5202 (e.g., an inner core) may be positioned between the first layer 5201 and the third layer 5203. For example, the first layer 5201, the second layer 5202, and/or the third layer 5203 may be formed by compressing (e.g., thermally compressing) a plurality of prepregs. The second layer 5202 may include a fifth space portion 5204 (e.g., an opening) in which the first hinge arm 710 is disposed. An operation of disposing the first hinge arm 710 in the fifth space portion 5204 of the second layer 5202 and an operation of coupling (e.g., thermally compressing) the first layer 5201, the second layer 5202, and the third layer 5203 by using an adhesive material (e.g., a thermally reactive adhesive agent) may be performed. With this method, the one or more first hinge arms 710 may be disposed in the second plate 520 in a state in which the one or more first hinge arms 710 extend into the second plate 520 (e.g., in-molding). The one or more first hinge arms 710 may be coupled to the first layer 5201, the second layer 5202, and the third layer 5203 by means of the adhesive material. The number of layers included in the second plate 520 may vary without being limited to an embodiment illustrated in FIG. 7B.

According to an embodiment, although not illustrated, the third plate 530 may be implemented in substantially the same way as the second plate 520, and the one or more second hinge arms 720 may be disposed in the third plate 530 in a state in which the one or more second hinge arms 720 extend into the third plate 530. For example, the third plate 530 may include a third composite material sheet formed by compressing a plurality of prepreg, and the one or more second hinge arms 720 may be positioned and extend into the third composite material sheet (e.g., in-molding).

According to another embodiment, the second plate 520 coupled to the one or more first hinge arms 710 may be implemented by insert molding. According to another embodiment, the third plate 530 coupled to the one or more second hinge arms 720 may be implemented by insert molding.

According to an embodiment, the one or more first hinge arms 710 may be provided in the form of a plate to minimize a thickness of the second plate 520 while increasing a junction area with the second plate 520. The first hinge arm having a plate shape may be referred to as a first hinge plate. The one or more second hinge arms 720 may be provided in the form of a plate to minimize a thickness of the third plate 530 while increasing a junction area with the third plate 530. The second hinge arm having a plate shape may be referred to as a second hinge plate. At least a part of the hinge 700 may contribute to slimness of the cover 100 by simplifying the structure positioned in the second plate 520 or the third plate 530.

According to an embodiment, the rotary part 730 may define the first folding axis C1 (e.g., a shaft included in the rotary part 730) and be disposed along the first folding axis C1 between one side edge of the second plate 520 and one side edge of the third plate 530. In any embodiment, various other terms such as a 'hinge assembly' including the second plate 520, the third plate 530, and the hinge 700 may be used.

According to an embodiment, the second plate 520 and the third plate 530 may each have a rectangular shape extending in the opposite directions based on the first folding axis C1 and having the same width in the direction of the first folding axis C1 (e.g., the x-axis direction). The second plate 520 may at least partially overlap the first area 510a of the first plate 510 when viewed from above the first plate 510 (e.g., when viewed in the x-axis direction). The first plate 510 and the second plate 520 may be substantially parallel to each other. As illustrated, in case that the second plate 520 and the third plate 530 substantially define an angle of 180 degrees, the third plate 530 may be disposed substantially in parallel with the first plate 510 while at least partially overlapping the first plate 510. The third plate 530 may be rotated about the first folding axis C1 relative to the second plate 520 while deviating from the state parallel to the first plate 510, such that the third plate 530 may define the corresponding angle with respect to the first plate 510. The second plate 520 may be included in the first cover part 110 (see FIG. 6A or 6B), and the third plate 530 may be included in the second cover part 120 (see FIG. 6A or 6B).

According to an embodiment, the one or more second magnetic elements 620 (e.g., the one or more second magnets) may be positioned in the first plate 510. The one or more second magnetic elements 620 may be positioned in the first plate 510 in substantially the same way as the plurality of first magnetic elements 610. For example, the one or more second magnetic elements 620 may be at least partially positioned in the first plate 510. According to an embodiment, the second layer 5102 (see FIG. 7A) of the first plate 510 may further include not only the first space portions (e.g., see the first space portion 5104) in which the plurality of first magnetic elements 610 is disposed, but also second space portions in which the one or more second magnetic elements 620 are disposed. An operation of disposing the plurality of first magnetic elements 610 in the first space portions of the second layer 5102 and disposing the one or more second magnetic elements 620 in the second space portions of the second layer 5102 and an operation of coupling (e.g., thermally compressing) the first layer 5101, the second layer 5102, and the third layer 5103 by using an adhesive material (e.g., a thermally reactive adhesive agent) may be performed. With this method, the plurality of first magnetic elements 610 and the one or more second magnetic elements 620 may be positioned in the first plate 510 (e.g., in-molding). The plurality of first magnetic elements 610 and the one or more second magnetic elements 620 may be coupled to the first layer 5101, the second layer 5102, and the third layer 5103 by means of the adhesive material.

According to an embodiment, the one or more third magnetic elements 630 (e.g., the one or more third magnets) may be positioned in the third plate 530. The one or more third magnetic elements 630 may be positioned in the third plate 530 in substantially the same way as the plurality of first magnetic elements 610. For example, the one or more third magnetic elements 630 may be at least partially positioned in the third plate 530. With reference to the cross-sectional structure 703 (see FIG. 7C) taken along line F-F' in FIG. 5, the third plate 530 may be a third composite material sheet and include a first layer 5301, a second layer 5302, and a third layer 5303, for example. The second layer 5302 (e.g., an inner core) may further include not only sixth space portions (not illustrated) in which the one or more second hinge arms 720 are disposed, but also third space portions (e.g., see a third space portion 5304) in which the one or more third magnetic elements 630 are disposed. An operation of disposing the one or more second hinge arms 720 in the sixth space portions of the second layer 5302 and disposing the one or more third magnetic elements 630 in the third space portions of the second layer 5202 and an operation of coupling (e.g., thermally compressing) the first layer 5301, the second layer 5302, and the third layer 5303 by using an adhesive material (e.g., a thermally reactive adhesive agent) may be performed. With this method, the one or more second hinge arms 720 and the one or more third magnetic elements 630 may be positioned in the third plate 530 (e.g., in-molding). The one or more second hinge arms 720 and the one or more third magnetic elements 630 may be coupled to the first layer 5301, the second layer 5302, and the third layer 5303 by means of the adhesive material. The number of layers included in the third plate 530 may vary without being limited to an embodiment illustrated in FIG. 7C.

According to an embodiment, when the first plate 510 and the third plate 530 substantially define an angle of 0 degree (or disposed in parallel with each other) while overlapping each other, the one or more second magnetic elements 620 and the one or more third magnetic elements 630 may be aligned with one another while overlapping one another in a one-to-one manner. The state in which the third plate 530 is parallel to the first plate 510 while overlapping the first plate 510 may be maintained by an attractive force between the one or more second magnetic elements 620 and the one or more third magnetic elements 630 that are aligned with one another while overlapping one another.

According to an embodiment, the one or more third magnetic elements 630 may be positioned in the third plate 530 so as to be closer to the other side edge 533 parallel to one side edge than one side edge disposed adjacent to the first folding axis C1. This prevents the attractive force between the one or more second magnetic elements 620 and the one or more third magnetic elements 630 from being applied to be close to the first folding axis C1. Therefore, it is possible to allow the second cover part 120 (see FIG. 6A or 6B) including the third plate 530 to be tightly attached to the first plate 510 or it is possible to improve openness when the second cover part 120 is attached to or separated from the first plate 510. The number of third magnetic elements or the position of the third magnetic element and the number of second magnetic elements or the position of the second magnetic element corresponding to the third magnetic element may vary without being limited to an embodiment illustrated in FIG. 5 or 6A.

According to an embodiment, the fourth plate 540 may be disposed to be rotatable relative to the second plate 520 and provided at the side different from the side of the third plate 530. In the illustrated example, the fourth plate 540 may be rotated relative to the second plate 520 and provided at the side opposite to the side of the third plate 530, and the fourth plate 540 may be included in the third cover part 130 (see FIG. 6A or 6B). For example, the folding axis between the second plate 520 and the fourth plate 540 may be parallel to the first folding axis C1 between the second plate 520 and the third plate 530. An area in which the fourth plate 540 overlaps the rear surface 201 of the electronic device 200 (see FIG. 4) when the second plate 520 and the fourth plate 540 substantially define an angle of 180 degrees may be positioned at the side opposite to the side of the fourth area 201b (see FIG. 1) with the third area 201a (see FIG. 1) interposed therebetween.

According to another embodiment, the fourth plate 540 may be disposed to be rotatable relative to the second plate 520 and provided at another side without being limited to the illustrated embodiment.

According to an embodiment, the first plate 510 may be formed so as not to be expanded to the area in which the fourth plate 540 overlaps the rear surface 201 of the electronic device 200 (see FIG. 4) when the second plate 520 and the fourth plate 540 substantially define an angle of 180 degrees. For example, the first plate 510 may be formed so as not to be expanded between the fourth plate 540 and the rear surface 201 of the electronic device 200 (see FIG. 4) when the second plate 520 and the fourth plate 540 substantially defines an angle of 180 degrees.

According to an embodiment, the one or more fourth magnetic elements 640 (e.g., the one or more fourth magnets) may be positioned in the fourth plate 540. The one or more fourth magnetic elements 640 may be positioned in the fourth plate 540 in substantially the same way as the plurality of first magnetic elements 610. For example, the one or more fourth magnetic elements 640 may be at least partially positioned in the fourth plate 540. The one or more fourth magnetic elements 640 may be aligned with and overlap the one or more magnetic elements included in the electronic device 200 in a one-to-one manner, and the third cover part 130 may be attached to the electronic device 200 by the attractive force between the one or more fourth magnetic elements 640 and the one or more magnetic elements included in the electronic device 200.

According to various embodiments (not illustrated), the fourth plate 540 may be a fourth composite material sheet formed by compressing a plurality of prepregs and include a first layer, a second layer, and a third layer, for example. The second layer may include fourth space portions (e.g., substantially identical in shape to the first space portion 510d) in which the one or more fourth magnetic elements 640 are disposed. An operation of disposing the one or more fourth magnetic elements 640 in the fourth space portions of the second layer and an operation of coupling (e.g., thermally compressing) the first layer, the second layer, and the third layer by using an adhesive material (e.g., a thermally reactive adhesive agent). With this method, the one or more fourth magnetic elements 640 may be positioned in the fourth plate 540 (e.g., in-molding). The one or more fourth magnetic elements 640 may be coupled to the first layer, the second layer, and the third layer by means of the adhesive material.

According to an embodiment, the pen cover part 105, which includes the recess 104, and a structure 106, which includes the first opening 101, may be disposed on the fourth plate 540. The structure 106 may include a material different from a material of the fourth plate 540. For example, the structure 106 and the fourth plate 540 may be formed by dual injection molding. According to any embodiment, the structure 106 and the fourth plate 540 may be integrated and include the same material.

According to an embodiment, the first sheet 810 may include a first part 1 coupled to the second plate 520, a second part 2 coupled to the third plate 530, and/or a third part 3 coupled to the fourth plate 540. The second sheet 820 may include a fourth part 4 coupled to the second plate 520, a fifth part 5 coupled to the third plate 530, and/or a sixth part 6 coupled to the fourth plate 540. The second plate 520 may be positioned between the first part 1 and the fourth part 4 and may not be exposed to the outside. The third plate 530 may be positioned between the second part 2 and the fifth part 5 and may not be exposed to the outside. The fourth plate 540 may be positioned between the third part 3 and the sixth part 6 and may not be exposed to the outside. An adhesive polymer material may be disposed between the second plate 520 and the first part 1, between the second plate 520 and the fourth part 4, between the third plate 530 and the second part 2, between the third plate 530 and the fifth part 5, between the fourth plate 540 and the third part 3, and/or between the fourth plate 540 and the sixth part 6. For example, the adhesive material may include a thermally reactive adhesive agent, a general adhesive agent, and/or a double-sided tape.

According to an embodiment, the first sheet 810 and/or the second sheet 820 may include leather. According to another embodiment, the first sheet 810 and/or the second sheet 820 may include a fabric. According to another embodiment, the first sheet 810 and/or the second sheet 820 may include various polymers.

According to an embodiment, the first sheet 810 may include a first folding part F1 between the first part 1 and the second part 2, and a second folding part F2 between the first part 1 and the third part 3. The first folding part F1 and the second folding part F2 may extend in parallel with each other in the direction of the first folding axis C1 (e.g., the x-axis direction). The first folding part F1 may overlap the first folding axis C1. For example, the first part 1 and the second part 2 may have the same width extending in the direction of the first folding axis C1 and be rectangular areas extending toward two opposite sides based on the first folding part F1. For example, the third part 3 may have the same width, which extends in the direction of the first folding axis C1, as the first part 1. The third part 3 may be a rectangular area extending from the second folding part F2 toward the side opposite to the first part 1. The first part 1 may be included in the first cover part 110 (FIG. 6A or 6B). The second part 2 may be included in the second cover part 120 (FIG. 6A or 6B). The third part 3 may be included in the third cover part 130 (FIG. 6A or 6B). The first folding part F1 and the second folding part F2 have higher bendability than the other parts of the first sheet 810. For example, the first folding part F1 and the second folding part F2 may be variously implemented to have a shape (e.g., a groove extending in the direction of the first folding axis C1) having a relatively smaller thickness than the other parts or have a shape having an opening (e.g., a fourth opening 814 formed in the first folding part F1).

According to an embodiment, the second sheet 820 may include a third folding part F3 between the fourth part 4 and the fifth part 5, and a fourth folding part F4 between the fourth part 4 and the sixth part 6. The third folding part F3 and the fourth folding part F4 may extend in parallel with each other in the direction of the first folding axis C1 (e.g., the x-axis direction). For example, the fourth part 4 and the fifth part 5 may have the same width extending in the direction of the first folding axis C1 and have rectangular shapes extending toward two opposite sides based on the third folding part F3. For example, the sixth part 6 may have the same width, which extends in the direction of the first folding axis C1, as the fourth part 4. The sixth part 6 may have a rectangular shape extending from the fourth folding part F4 toward the side opposite to the fourth part 4. The fourth part 4 may be included in the first cover part 110 (see FIG. 6A or 6B). The fifth part 5 may be included in the second cover part 120 (see FIG. 6A or 6B). The sixth part 6 may be included in the third cover part 130 (see FIG. 6A or 6B). The third folding part F3 and the fourth folding part F4 have higher bendability than the other parts of the second sheet 820. For example, the third folding part F3 and the fourth folding part F4 may be variously implemented to have a shape (e.g., a groove extending in the direction of the first folding axis C1) having a relatively smaller thickness than the other parts. The third folding part F3 may overlap the first folding axis C1. The rotary part 730 of the hinge 700 may be positioned between the first folding part F1 of the first sheet 810 and the third folding part F3 of the second sheet 820. The first folding part F1 of the first sheet 810 and the third folding part F3 of the second sheet 820 may be positioned to cover edges of two opposite ends of the rotary part 730 of the hinge 700 (see the parts indicated by reference numerals '821' and '822' in FIG. 6B). The fourth folding part F4 may overlap the second folding part F2 of the first sheet 810. The second folding part F2 of the first sheet 810 and the fourth folding part F4 of the second sheet 820 may define the second folding axis C2 (see FIG. 6A or 6B) of the cover 100. Even though the third cover part 130 (see FIG. 6A or 6B) including the fourth plate 540 is not directly and hingely connected to the second plate 520, the third cover part 130 may be rotated relative to the first cover part 110 (see FIG. 6A or 6B) including the second plate 520 about the second folding axis C2 defined by the second folding part F2 of the first sheet 810 and the fourth folding part F4 of the second sheet 820.

According to an embodiment, the first sheet 810 may include a second opening 102 formed in the third part 3. The second opening 102 may overlap the recess 104 and the first opening 101 of the fourth plate 540.

According to an embodiment, the second sheet 820 may include a third opening 103 formed in the sixth part 6. With reference to FIG. 6B, at least a part of the structure 106 may be exposed through the third opening 103. For example, the first opening 101 included in the structure 106 may be exposed through the third opening 103. For example, the pen cover part 105 may be disposed in a shape passing through the third opening 103 of the second sheet 820 and protruding in a z-axis direction.

According to an embodiment, an edge of the cover part assembly 140 disposed along the dotted line indicated by reference numeral 'E' (see FIG. 6A or 6B) may be formed by coupling the first sheet 810 and the second sheet 820.

According to an embodiment, the first plate 510 may be coupled and attached to the first cover part 110 (see FIG. 6A or 6B). The first part 1 of the first sheet 810 included in the first cover part 110 may be positioned between the first area 510a of the first plate 510 and the second plate 520. An adhesive material (e.g., a thermally reactive adhesive agent) may be disposed between the first part 1 of the first sheet 810 and the first area 510a of the first plate 510.

According to an embodiment, the second cover part 120 (e.g., see FIG. 6A or 6B) may be rotated about the first folding axis C1 relative to the first cover part 110. In accordance with a rotation angle of the second cover part 120, the second cover part 120 may define a corresponding angle with respect to the second area 510b by adjoining the second area 510b of the first plate 510 or being separated from the second area 510b of the first plate 510.

Figure 8:
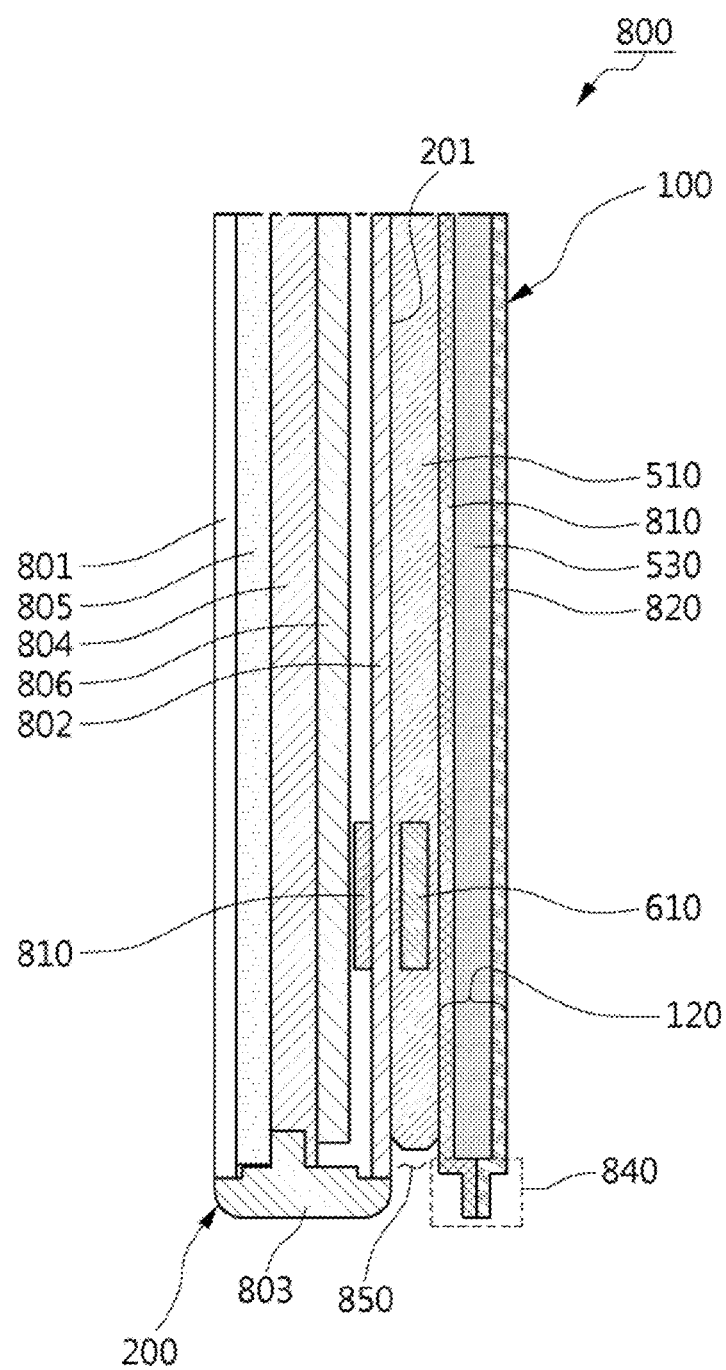
FIG. 8 is a view illustrating a cross-sectional structure taken along line C-C' in FIG. 1 according to an embodiment.

FIG. 8 is a view illustrating a cross-sectional structure 800 taken along line C-C' in FIG. 1 according to an embodiment.

A repeated description of some of the reference numerals in FIG. 8 will be omitted.

With reference to FIG. 8, in an embodiment, the electronic device 200 may include a housing that at least partially defines an external appearance. The housing may include a front surface plate 801 configured to at least partially define a front surface, a rear surface plate 802 configured to at least partially define the rear surface 201, and a lateral member 803 configured to at least partially surround a space between the front surface plate 801 and the rear surface plate 802. The electronic device 200 may include a support member (e.g., a bracket) 804 positioned between the front surface plate 801 and the rear surface plate 802. The support member 804 may be connected to the lateral member 803 or integrated with the lateral member 803. A display 805 may be provided between the front surface plate 801 and the support member 804 and disposed on the support member 804, light outputted from the display 805 may propagate to the outside while passing through the front surface plate 801. A printed circuit board 806 may be provided between the rear surface plate 802 and the support member 804 and disposed on the support member 804. According to an embodiment, the magnetic element 810 may be provided in the electronic device 200 and disposed on the rear surface plate 802. A position of the magnetic element 810 may be variously configured without being limited to an embodiment illustrated in FIG. 8. For example, the magnetic element 810 may be positioned in the rear surface plate 802.

According to an embodiment, the cover 100 may be attached to the rear surface 201 of the electronic device 200. The magnetic element 810 included in the electronic device 200 and the one of the plurality of first magnetic elements 610 positioned in the first plate 510 of the cover 100 may be aligned to at least partially overlap each other when viewed from above the front surface plate 801. The cover 100 may be attached to the rear surface 201 of the electronic device 200 by an attractive force between the magnetic element 810 included in the electronic device 200 and the plurality of first magnetic elements 610 positioned in the first plate 510.

According to an embodiment, the edge of the cover part assembly 140 (see FIG. 6A or 6B) may be formed by joining the first sheet 810 and the second sheet 820. For example, in FIG. 8, an edge 840 of the second cover part 120 may be formed by coupling the first sheet 810 and the second sheet 820, and a coupling structure may cover a side surface of the third plate 530.

According to an embodiment, as illustrated in FIG. 8, in the state in which the second cover part 120 is attached to the first plate 510 by the attractive force between the magnetic elements, a gap 850 may be formed between the second cover part 120, the rear surface 201 of the electronic device 200, and the first plate 510. In the state in which the second cover part 120 is attached to the first plate 510 by the attractive force between the magnetic elements, the first plate 510 may not overlap the edge 840 of the second cover part 120 when viewed from above the front surface plate 801. The size of the first plate 510 may be reduced so that the first plate 510 does not overlap the second cover part 120 any further without being limited to the example illustrated in FIG. 8. According to an embodiment, the gap 850 allows the user to easily manipulate the second cover part 120 when the user rotates the second cover part 120. The gap may also be formed for the first cover part 110 and/or the third cover part 130 illustrated in FIG. 6A or 6B.

According to various embodiments, the first plate 510 may be implemented to be substituted for the rear surface plate 802 of the electronic device 200. In this case, the plurality of first magnetic elements 610 illustrated in FIG. 5 may be eliminated from the first plate 510.

Figure 9:
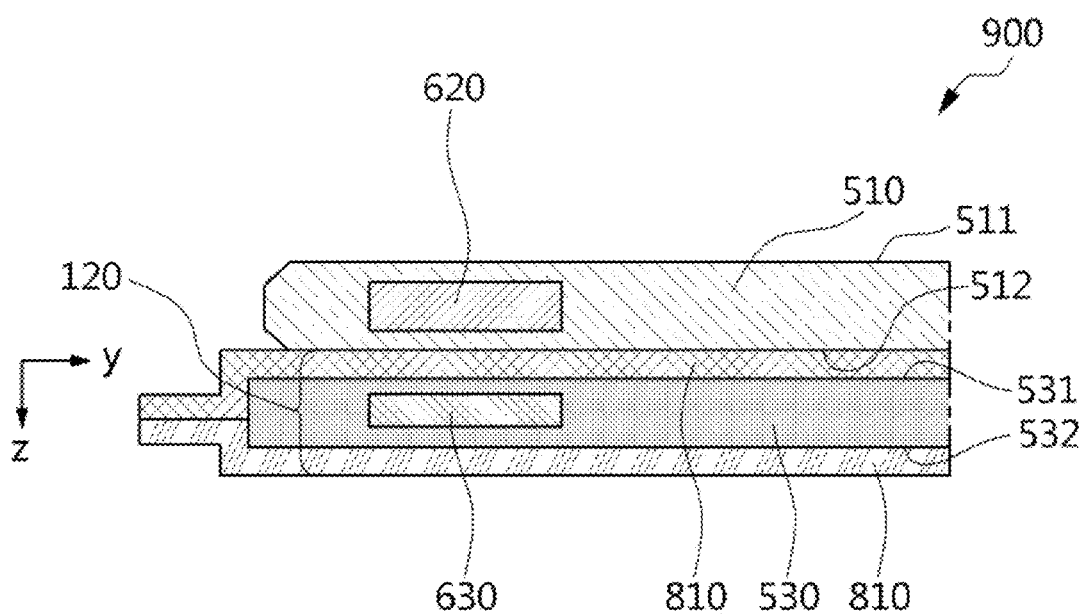
FIG. 9 is a view illustrating a cross-sectional structure taken along line A-A' in FIG. 6A according to an embodiment.

FIG. 9 is a view illustrating a cross-sectional structure 900 taken along line A-A' in FIG. 6A according to an embodiment. A repeated description of some of the reference numerals will be omitted.

With reference to FIG. 9, in an embodiment, the second cover part 120 may be attached to the first plate 510 by an attractive force between the one or more second magnetic elements 620 positioned in the first plate 510 and the one or more third magnetic elements 630 positioned in the third plate 530 included in the second cover part 120. The one or more second magnetic elements 620 may be positioned at various other positions without being limited to the example illustrated in FIG. 9. For example, the one of the one or more second magnetic elements 620 may be disposed in a recess formed in the first surface 511 or a second surface 512 of the first plate 510. The one or more third magnetic elements 630 may be positioned at various other positions without being limited to the example illustrated in FIG. 9. For example, one of the one or more third magnetic elements 630 may be disposed in a recess formed in one surface 531 or the other surface 532 of the third plate 530.

Figure 10:
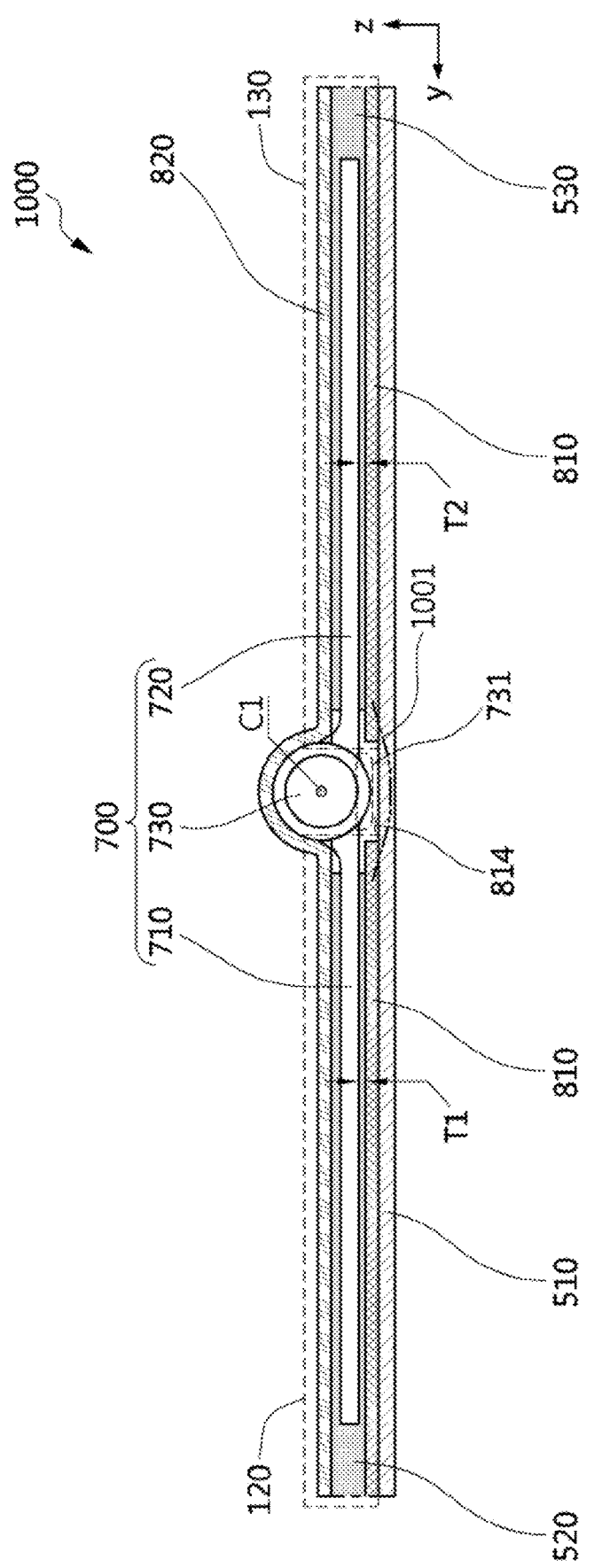
FIG. 10 is a view illustrating a cross-sectional structure taken along line B-B' in FIG. 6B according to an embodiment.

FIG. 10 is a view illustrating a cross-sectional structure 1000 taken along line B-B' in FIG. 6B according to an embodiment. A repeated description of some of the reference numerals will be omitted.

With reference to FIG. 10, in an embodiment, the first hinge arm 710 of the hinge 700 may be at least partially positioned in the second plate 520. The second hinge arm 720 of the hinge 700 may be at least partially positioned in the third plate 530.

According to an embodiment, the first sheet 810 may include the fourth opening 814 corresponding to the rotary part 730 of the hinge 700. A part 731 of the rotary part 730 included in the hinge 700 may protrude toward the first plate 510 relative to the second plate 520 and/or the third plate 530. The part 731 of the rotary part 730 may be disposed in the fourth opening 814 of the first sheet 810. Although not illustrated, the fourth opening 814 may be substituted for a recess formed in one surface of the first sheet 810 that faces the rotary part 730. The part 731 of the rotary part 730 may be inserted into the recess. The fourth opening 814 may prevent damage to the cross-sectional structure 1000 illustrated in FIG. 10 and/or contribute to slimness of the cross-sectional structure 1000.

For example, in case that the first sheet 810 may not include the fourth opening 814 or the recess corresponding to the part 731 of the rotary part 730, the first sheet 810 may be deformed as indicated by the imaginary line designated by reference numeral '1001' by being pressed by the part 731 of the rotary part 730. For this reason, the coupling between the second plate 520 and the first sheet 810, the coupling between the third plate 530 and the first sheet 810, and/or the coupling between the first sheet 810 and the first plate 510 may be unstable or damaged. The first sheet 810 may not include the fourth opening 814 or the recess, and a first thickness T1 of a portion positioned between the first sheet 810 and the first hinge arm 710 of the second plate 520 and/or a second thickness T2 of a portion positioned between the first sheet 810 and the second hinge arm 720 of the third plate 530 may be increased, which makes it possible to prevent the part 731 of the rotary part 730 from affecting the first sheet 810. However, the thickness of the cover 100 may be increased.

According to various embodiments, the thickness of the first sheet 810 may be about 0.42 mm, the thickness of the second sheet 820 may be about 0.42 mm, and the thickness of the second plate 520 and/or the third plate 530 (e.g., a height between the first sheet 810 and the second sheet 820) may be about 1.1 mm. According to various embodiments, the thickness of the first cover part 110 (see FIG. 1) or the second cover part 120 (see FIG. 1) may be about 1.8 mm to about 2.0 mm.

According to various embodiments, the first sheet 810 may not include the fourth opening 814 or the recess, and the second hinge arm 720 may be positioned to be closest to the second sheet 820 so that the first hinge arm 710 is positioned to be closest to the second sheet 820. For example, although not illustrated, a first recess may be provided in one surface of the second plate 520 that faces the first sheet 810, and the first hinge arm 710 may be disposed in the first recess. For example, a second recess may be provided in one surface of the third plate 530 that faces the second sheet 820, and the second hinge arm 720 may be disposed in the second recess. In this case, the first hinge arm 710 may be implemented so as not to protrude toward the second sheet 820 relative to the second plate 520, and the second hinge arm 720 may be implemented so as not to protrude toward the second sheet 820 relative to the third plate 530.

According to any embodiment (not illustrated), in case that the rotary part 730 of the hinge 700 has a smaller size than that in an embodiment illustrated in FIG. 10, the first sheet 810 may not include the fourth opening 814 or the recess or may have only a shape for the first folding part F1 (see FIG. 5).

According to any embodiment, the first sheet 810 may have a part corresponding to the second cover part 120 and a part corresponding to the third cover part 130 that are separated from each other at a spacing distance while being substituted for the fourth opening 814.

Figure 11:
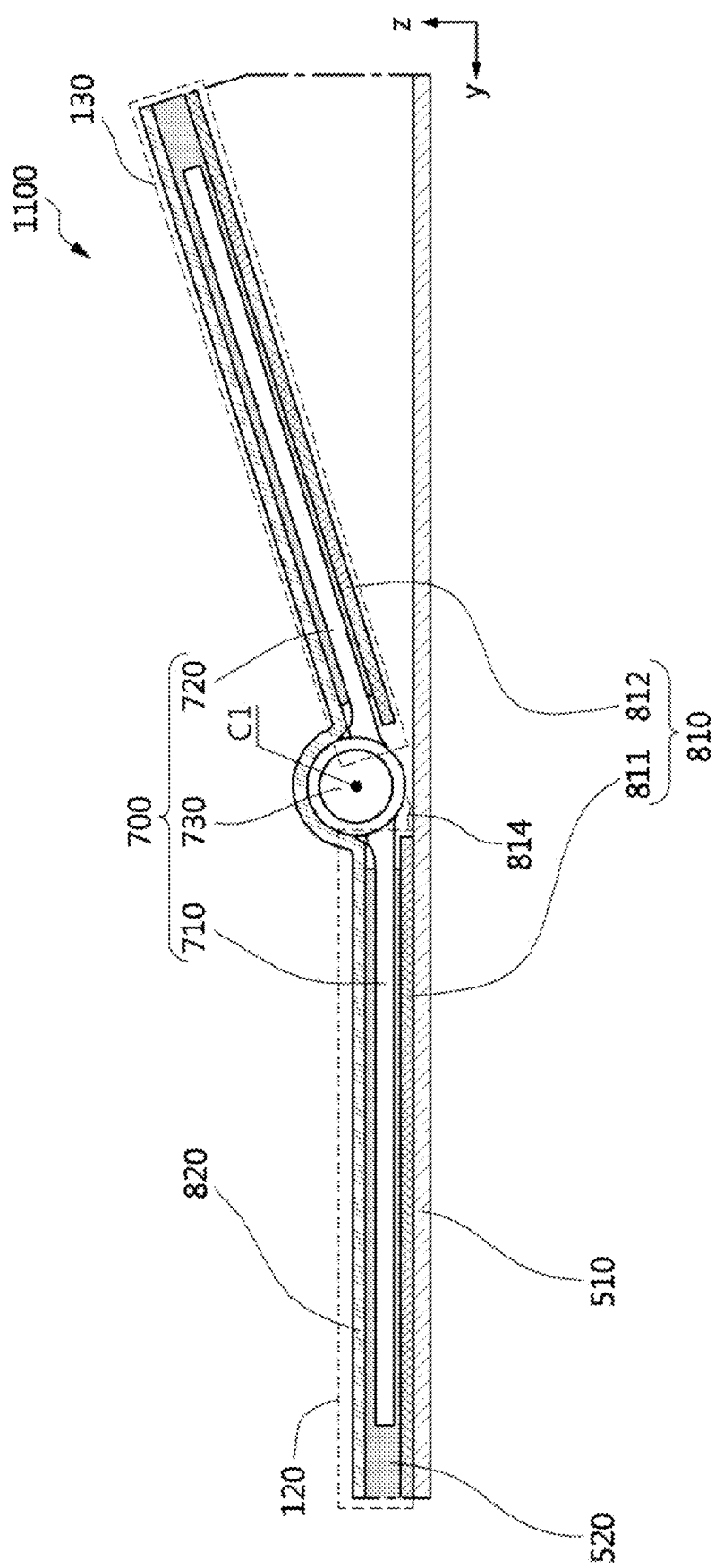
FIG. 11 is a view illustrating a cross-sectional structure in a state in which a third cover part according to an embodiment is rotated relative to a second cover part so as to be separated from a first plate.

FIG. 11 illustrates a cross-sectional structure 1100 in which the third cover part 130 according to an embodiment is rotated relative to the second cover part 120 so as to be separated from the first plate 510. A repeated description of some of the reference numerals in FIG. 11 will be omitted.

With reference to FIG. 11, in an embodiment, the fourth opening 814 may reduce damage to the first sheet 810 when the third cover part 130 is rotated about the first folding axis C1 relative to the second cover part 120. For example, in case that the first sheet 810 does not include the fourth opening 814 corresponding to the rotary part 730, a part 811 corresponding to the second cover part 120 and a part 812 corresponding to the third cover part 130 are moved away from each other when the third cover part 130 is rotated. For this reason, a part of the first sheet 810, which corresponds to the rotary part 730, may be damaged by tensile stress.

According to an embodiment of the present disclosure, the electronic device cover (e.g., the cover 100 in FIG. 5) may include the first plate (e.g., the first plate 510 in FIG. 5) that may be attached to or detached from one surface (e.g., the rear surface 201 in FIG. 4) of the electronic device. The electronic device may include the second plate (e.g., the second plate 520 in FIG. 5) coupled to overlap the first plate. The electronic device may include the third plate (e.g., the third plate 530 in FIG. 5) connected to the second plate by means of the hinge (e.g., the hinge 700 in FIG. 5). The angle defined by the first plate and the third plate may be changed by the rotation of the third plate relative to the second plate. The second plate and/or the third plate may each include a composite material sheet. At least a part of the hinge may be positioned in the composite material sheet.

According to an embodiment of the present disclosure, the hinge (e.g., the hinge 700 in FIG. 5) may include one or more first hinge plates (e.g., the one or more first hinge arms 710 in FIG. 5) at least partially positioned in the composite material sheet that constitutes the second plate (e.g., the second plate 520 in FIG. 5). The hinge may include one or more second hinge plates (e.g., the one or more second hinge arms 720 in FIG. 5) at least partially positioned in another composite material sheet that constitutes the third plate (e.g., the third plate 530 in FIG. 5). The hinge may include the rotary parts (e.g., the rotary part 730 in FIG. 5) configured to connect the one or more first hinge plates and the one or more second hinge plates.

According to an embodiment of the present disclosure, the cover (e.g., the cover 100 in FIG. 5) may further include the plurality of magnetic elements (e.g., the plurality of first magnetic elements 610 in FIG. 5) at least partially positioned in the composite material sheet that constitutes the first plate (e.g., the first plate 510 in FIG. 5). The plurality of magnetic elements applies attractive forces between the first plate and the electronic device.

According to an embodiment of the present disclosure, the cover (e.g., the cover 100 in FIG. 5) may further include: the magnetic elements (e.g., the one or more second magnetic elements 620 in FIG. 5) at least partially positioned in the composite material sheet that constitutes the first plate (e.g., the first plate 510 in FIG. 5); and another magnetic element (e.g., the one or more third magnetic elements 630 in FIG. 5) at least partially positioned in another composite material sheet that constitutes the third plate (e.g., the third plate 530 in FIG. 5). The magnetic element and the other magnetic element overlap each other when the first plate and the third plate define an angle of 0 degree, such that the attractive force may be applied between the first plate and the third plate.

According to an embodiment of the present disclosure, the cover (e.g., the cover 100 in FIG. 5) may further include the fourth plate (e.g., the fourth plate 540 in FIG. 5) disposed at the side opposite to the third plate (e.g., the third plate 530 in FIG. 5) and configured to be rotatable relative to the second plate (e.g., the second plate 520 in FIG. 5).

According to an embodiment of the present disclosure, the cover (e.g., the cover 100 in FIG. 5) may further include at least one sheet (e.g., the first sheet 810 and/or the second sheet 820 in FIG. 5) attached to the second plate (e.g., the second plate 520 in FIG. 5), the third plate (e.g., the third plate 530 in FIG. 5), and the fourth plate (e.g., the fourth plate 540 in FIG. 5). The at least one sheet may have the folding part (e.g., the first folding part F1 and/the third folding part F3 in FIG. 5) between the second plate and the third plate, and another folding part (e.g., the second folding part F2 and/or the fourth folding part F4 in FIG. 5) between the second plate and the fourth plate.

According to an embodiment of the present disclosure, the first plate (e.g., the first plate 510 in FIG. 5) may be formed so as not to be expanded to the area in which the fourth plate overlaps one surface (e.g., the rear surface 201 in FIG. 5) when the second plate (e.g., the second plate 520 in FIG. 5) and the fourth plate (e.g., the fourth plate 540 in FIG. 5) define an angle of 180 degrees.

According to an embodiment of the present disclosure, the cover (e.g., the cover 100 in FIG. 5) may further include one or more magnetic elements (e.g., the one or more fourth magnetic elements 640 in FIG. 5) at least partially positioned in the fourth plate (e.g., the fourth plate 540 in FIG. 5). The one or more magnetic elements may overlap one or more magnetic elements included in the electronic device and apply the attractive force when the second plate (e.g., the second plate 520 in FIG. 5) and the fourth plate define an angle of 180 degrees.

According to an embodiment of the present disclosure, the fourth plate (e.g., the fourth plate 540 in FIG. 5) may further include the recess (e.g., the recess 104 in FIG. 4) configured to accommodate the pen input device (e.g., the pen input device 400 in FIG. 4) positioned on one surface (e.g., the rear surface 201 in FIG. 4) when the second plate (e.g., the second plate 520 in FIG. 5) and the fourth plate define an angle of 180 degrees.

According to an embodiment of the present disclosure, the fourth plate (e.g., the fourth plate 540 in FIG. 5) may further include the opening (e.g., the first opening 101 in FIG. 5) that overlaps the camera module (e.g., the first camera module 202, the second camera module 203, or the flash 204 in FIG. 4) positioned on one surface (e.g., the rear surface 201 in FIG. 4) when the second plate (e.g., the second plate 520 in FIG. 5) and the fourth plate define an angle of 180 degrees.

According to an embodiment of the present disclosure, the cover (e.g., the cover 100 in FIG. 5) may further include the first sheet (e.g., the first sheet 810 in FIG. 5). The first sheet may include: the first part (e.g., the first part 1 in FIG. 5) positioned between the first plate (e.g., the first plate 510 in FIG. 5) and the second plate (e.g., the second plate 520 in FIG. 5); the second part (e.g., the second part 2) extending from the first part and coupled to the third plate (e.g., the third plate 530 in FIG. 5); and the third part (e.g., the third part 3 in FIG. 5) extending from the first part and coupled to the fourth plate (e.g., the fourth plate 540 in FIG. 5). The first sheet may include: the first folding part (e.g., the first folding part F1 in FIG. 5) between the first part and the second part; and the second folding part (e.g., the second folding part F2 in FIG. 5) between the first part and the third part.

According to an embodiment of the present disclosure, the cover (e.g., the cover 100 in FIG. 5) may further include the adhesive material disposed between the first plate (e.g., the first plate 510 in FIG. 5) and the first part (e.g., the first part 1 in FIG. 5).

According to an embodiment of the present disclosure, the first folding part (e.g., the first folding part F1 in FIG. 5) may include the opening (e.g., the fourth opening 814 in FIG. 5, 10, or 11) that overlaps the hinge (e.g., the hinge 700 in FIG. 5).

According to an embodiment of the present disclosure, the cover (e.g., the cover 100 in FIG. 5) may further include the second sheet (e.g., the second sheet 820 in FIG. 5). The second sheet may include: the fourth part (e.g., the fourth part 4 in FIG. 5) coupled to the second plate (e.g., the second plate 520 in FIG. 5); the fifth part (e.g., the fifth part 5 in FIG. 5) extending from the fourth part and coupled to the third plate (e.g., the third plate 530 in FIG. 5); and the sixth part (e.g., the sixth part 6 in FIG. 5) extending from the fourth part and coupled to the fourth plate (e.g., the fourth plate 540 in FIG. 5). The second plate may be positioned between the first part (e.g., the first part 1 in FIG. 5) and the fourth part. The third plate may be positioned between the second part (e.g., the second part 2 in FIG. 5) and the fifth part. The fourth plate may be positioned between the third part (e.g., the third part 3 in FIG. 5) and the sixth part. The second sheet may include: the third folding part (e.g., the third folding part F3 in FIG. 5) between the fourth part and the fifth part; and the fourth folding part (e.g., the fourth folding part F4 in FIG. 5) between the fourth part and the sixth part.

According to various embodiments of the present disclosure, the electronic device cover (e.g., the cover 100 in FIG. 5) may include the first plate (e.g., the first plate 510 in FIG. 5) that may be attached to or detached from one surface (e.g., the rear surface 201 in FIG. 4) of the electronic device and made of the first composite material sheet. The cover may include the second plate (e.g., the second plate 520 in FIG. 5) coupled to overlap the first plate and made of the second composite material sheet. The cover may include the third plate (e.g., the third plate 530 in FIG. 5) connected to the second plate by means of the hinge (e.g., the hinge 700 in FIG. 7). The third plate may be made of the third composite material sheet. The angle defined by the first plate and the third plate may be changed by the rotation of the third plate relative to the second plate. The hinge may include one or more first hinge plates (e.g., the one or more first hinge arms 710 in FIG. 5) at least partially positioned in the second composite material sheet. The hinge may include one or more second hinge plates (e.g., the one or more second hinge arms 720 in FIG. 5) at least partially positioned in the third composite material sheet. The hinge may include the rotary parts (e.g., the rotary part 730 in FIG. 5) configured to connect the one or more first hinge plates and the one or more second hinge plates.

According to various embodiments of the present disclosure, the cover (e.g., the cover 100 in FIG. 5) may further include the plurality of first magnetic elements (e.g., the plurality of first magnetic elements 610 in FIG. 5) positioned in the first composite material sheet. The cover may further include one or more second magnetic elements (e.g., the one or more second magnetic elements 620 in FIG. 5) positioned in the first composite material sheet. The cover may further include one or more third magnetic elements (e.g., the one or more third magnetic elements 630 in FIG. 5) positioned in the third composite material sheet. The plurality of first magnetic elements applies attractive forces between the first plate and the electronic device. The one or more second magnetic elements and the one or more third magnetic elements may overlap one another and apply the attractive forces between the first plate and the third plate when the first plate and the third plate define an angle of 0 degree.

According to various embodiments of the present disclosure, the cover (e.g., the cover 100 in FIG. 5) may further include the fourth plate (e.g., the fourth plate 540 in FIG. 5) disposed at the side opposite to the third plate (e.g., the third plate 530 in FIG. 5) and configured to be rotatable relative to the second plate (e.g., the second plate 520 in FIG. 5). The first plate (e.g., the first plate 510 in FIG. 5) may be formed so as not to be expanded to the area in which the fourth plate overlaps one surface (e.g., the rear surface 201 in FIG. 4) when the second plate and the fourth plate define an angle of 180 degrees.

According to various embodiments of the present disclosure, the cover (e.g., the cover 100 in FIG. 5) may further include one or more fourth magnetic elements (e.g., the one or more fourth magnetic elements 640 in FIG. 5) positioned in the fourth plate (e.g., the fourth plate 540 in FIG. 5). The one or more fourth magnetic elements may overlap one or more magnetic elements included in the electronic device and apply the attractive force when the second plate and the fourth plate define an angle of 180 degrees.

According to various embodiments of the present disclosure, the fourth plate (e.g., the fourth plate 540 in FIG. 5) may further include the recess (e.g., the recess 104 in FIG. 4 or 5) configured to accommodate the pen input device (e.g., the pen input device 400 in FIG. 4) positioned on one surface (e.g., the rear surface 201 in FIG. 4) when the second plate (e.g., the second plate 520 in FIG. 5) and the fourth plate (e.g., the fourth plate 540 in FIG. 5) define an angle of 180 degrees.

According to various embodiments of the present disclosure, the cover (e.g., the cover 100 in FIG. 5) may further include at least one sheet (e.g., the first sheet 810 and/or the second sheet 820 in FIG. 5) attached to the second plate (e.g., the second plate 520 in FIG. 5), the third plate (e.g., the third plate 530 in FIG. 5), and the fourth plate (e.g., the fourth plate 540 in FIG. 5). The at least one sheet may have the folding part (e.g., the first folding part F1 and/the third folding part F3 in FIG. 5) between the second plate and the third plate, and another folding part (e.g., the second folding part F2 and/or the fourth folding part F4 in FIG. 5) between the second plate and the fourth plate.

The embodiments of the present disclosure disclosed in the present specification and illustrated in the drawings are provided as particular examples for easily explaining the technical contents according to the embodiment of the present disclosure and helping understand the embodiment of the present disclosure, but not intended to limit the scope of the embodiment of the present disclosure. Accordingly, the scope of the various embodiments of the present disclosure should be interpreted as including all alterations or modifications derived from the technical spirit of the various embodiments of the present disclosure in addition to the disclosed embodiments.

What is claimed is:

1. A cover for an electronic device, the cover comprising:
   a first plate configured to be attached to or detached from one surface of the electronic device;
   a second plate disposed to overlap the first plate;
   a third plate connected to the second plate by a hinge and configured such that an angle defined by the third plate and the first plate is changed by a rotation of the third plate relative to the second plate; and
   a first sheet comprising a first part disposed between the first plate and the second plate, and a second part extending from the first part and coupled to the third plate,
   wherein at least one of the second plate or the third plate comprises a composite material sheet,
   wherein at least a part of the hinge is disposed in the composite material sheet,
   wherein the first sheet comprises a first folding part disposed between the first part and the second part, and
   wherein the first folding part comprises an opening that overlaps the hinge.

2. The cover of claim 1, wherein the second and the third plates comprise composite material sheets, and the hinge comprises:
   one or more first hinge plates at least partially disposed in the composite material sheet of the second plate;
   one or more second hinge plates at least partially disposed in another composite material sheet of the third plate; and
   a rotary part configured to connect the one or more first hinge plates and the one or more second hinge plates.

3. The cover of claim 1, further comprising:
   a plurality of magnetic elements at least partially disposed in a composite material sheet of the first plate,
   wherein the plurality of magnetic elements applies an attractive force between the first plate and the electronic device.

4. The cover of claim 1, further comprising:
   a magnetic element at least partially disposed in a composite material sheet of the first plate; and another magnetic element at least partially disposed in another composite material sheet of the third plate,
wherein the magnetic element and the other magnetic element overlaps each other and applies an attractive force between the first plate and the third plate when the first plate and the third plate define an angle of 0 degree.

5. The cover of claim 1, further comprising:
a fourth plate disposed at a side opposite to the third plate and configured to be rotatable relative to the second plate.

6. The cover of claim 5, further comprising:
at least one sheet attached to the second plate, the third plate, and the fourth plate,
wherein the at least one sheet has a folding part disposed between the second plate and the third plate, and another folding part disposed between the second plate and the fourth plate.

7. The cover of claim 5, wherein the first plate is formed so as not to be expanded to an area in which the fourth plate overlaps one surface when the second plate and the fourth plate define an angle of 180 degrees.

8. The cover of claim 5, further comprising:
one or more magnetic elements at least partially disposed in the fourth plate,
wherein the one or more magnetic elements overlap one or more magnetic elements included in the electronic device and apply attractive forces when the second plate and the fourth plate define an angle of 180 degrees.

9. The cover of claim 5, wherein the fourth plate further comprises a recess configured to accommodate a pen input device disposed on one surface when the second plate and the fourth plate define an angle of 180 degrees.

10. The cover of claim 5, wherein the fourth plate further comprises an opening that overlaps a camera module disposed on one surface when the second plate and the fourth plate define an angle of 180 degrees.

11. The cover of claim 5,
wherein the first sheet further comprises a third part extending from the first part and coupled to the fourth plate,
wherein the first sheet further comprises a second folding part disposed between the first part and the third part.

12. The cover of claim 11, further comprising:
an adhesive material disposed between the first plate and the first part.

13. The cover of claim 11, further comprising:
a second sheet comprising a fourth part coupled to the second plate, a fifth part extending from the fourth part and coupled to the third plate, and a sixth part extending from the fourth part and coupled to the fourth plate,
wherein the second plate is disposed between the first part and the fourth part, the third plate is disposed between the second part and the fifth part, the fourth plate is disposed between the third part and the sixth part, and the second sheet comprises a third folding part disposed between the fourth part and the fifth part, and a fourth folding part disposed between the fourth part and the sixth part.

* * * * *